(12) United States Patent
Zhu et al.

(10) Patent No.: US 9,006,133 B2
(45) Date of Patent: Apr. 14, 2015

(54) ELECTROCHEMICAL CATALYSTS FOR FUEL CELLS

(75) Inventors: Yimin Zhu, Fremont, CA (US); Jay L. Goldman, Mountain View, CA (US); Baixin Qian, Sunnyvale, CA (US); Ionel C. Stefan, San Jose, CA (US); Mutsuko Komoda, Nara (JP); Hirotaka Mizuhata, Nara (JP); Takenori Onishi, Nara (JP)

(73) Assignees: OneD Material LLC, Palo Alto, CA (US); Sharp Kabushiki Kaisha, Osaka (JP)

( * ) Notice: Subject to any disclaimer, the term of this patent is extended or adjusted under 35 U.S.C. 154(b) by 978 days.

(21) Appl. No.: 13/124,800

(22) PCT Filed: Oct. 22, 2009

(86) PCT No.: PCT/US2009/061686
§ 371 (c)(1),
(2), (4) Date: Jul. 12, 2011

(87) PCT Pub. No.: WO2010/048407
PCT Pub. Date: Apr. 29, 2010

(65) Prior Publication Data
US 2011/0275011 A1 Nov. 10, 2011

Related U.S. Application Data

(60) Provisional application No. 61/108,304, filed on Oct. 24, 2008.

(51) Int. Cl.
*B01J 23/00* (2006.01)
*B01J 23/42* (2006.01)
*B01J 23/44* (2006.01)
(Continued)

(52) U.S. Cl.
CPC .............. *H01M 4/921* (2013.01); *H01M 4/926* (2013.01); *Y02E 60/50* (2013.01); *Y02E 60/523* (2013.01)

(58) Field of Classification Search
USPC .................................. 502/313, 317, 330, 339
See application file for complete search history.

(56) References Cited

U.S. PATENT DOCUMENTS 3,763,002 A 10/1973 Skomoroski et al.
4,849,311 A 7/1989 Itoh et al.
(Continued)

FOREIGN PATENT DOCUMENTS

JP 2890486 B2 5/1999
JP 2000-243411 A 9/2000
(Continued)

OTHER PUBLICATIONS

Fuel Cell Technology Handbook, Chapter 4, p. 12, e-book edition, edited by G. Hoogers, CRC Press LLC, 2003.
(Continued)

*Primary Examiner* — Patricia L Hailey
(74) *Attorney, Agent, or Firm* — Sterne, Kessler, Goldstein & Fox PLLC

(57) ABSTRACT

The present invention relates to electrochemical catalyst particles, including nanoparticles, which can be used membrane electrode assemblies and in fuel cells. In exemplary embodiments, the present invention provides electrochemical catalysts supported by various materials. Suitably the catalysts have an atomic ratio of oxygen to a metal in the nanoparticle of about 3 to about 6.

15 Claims, 11 Drawing Sheets

(51) Int. Cl.
B01J 23/58 (2006.01)
H01M 4/92 (2006.01)

(56) References Cited

U.S. PATENT DOCUMENTS

| | | | |
|---|---|---|---|
| 5,399,184 A | 3/1995 | Harada | |
| 5,505,928 A | 4/1996 | Alivisatos et al. | |
| 5,635,041 A | 6/1997 | Bahar et al. | |
| 5,690,807 A | 11/1997 | Clark, Jr. et al. | |
| 5,751,018 A | 5/1998 | Alivisatos et al. | |
| 5,897,945 A | 4/1999 | Lieber et al. | |
| 5,990,479 A | 11/1999 | Weiss et al. | |
| 5,997,832 A | 12/1999 | Lieber et al. | |
| 6,036,774 A | 3/2000 | Lieber et al. | |
| 6,048,616 A | 4/2000 | Gallagher et al. | |
| 6,136,156 A | 10/2000 | El-Shall et al. | |
| 6,165,635 A * | 12/2000 | Auer et al. | 429/524 |
| 6,225,198 B1 | 5/2001 | Alivisatos et al. | |
| 6,277,511 B1 | 8/2001 | Iwase et al. | |
| 6,297,185 B1 | 10/2001 | Thompson et al. | |
| 6,306,736 B1 | 10/2001 | Alivisatos et al. | |
| 6,413,489 B1 | 7/2002 | Ying et al. | |
| 6,482,763 B2 * | 11/2002 | Haugen et al. | 502/101 |
| 6,875,537 B2 | 4/2005 | Tani et al. | |
| 6,926,985 B2 | 8/2005 | Wariishi et al. | |
| 6,933,033 B1 | 8/2005 | Forsyth et al. | |
| 6,949,206 B2 | 9/2005 | Whiteford et al. | |
| 6,962,823 B2 | 11/2005 | Empedocles et al. | |
| 7,179,561 B2 | 2/2007 | Niu et al. | |
| 7,842,432 B2 | 11/2010 | Niu et al. | |
| 7,939,218 B2 * | 5/2011 | Niu | 429/532 |
| 8,278,011 B2 * | 10/2012 | Zhu et al. | 429/523 |
| 8,541,337 B2 * | 9/2013 | Xie et al. | 502/350 |
| 2002/0177032 A1 | 11/2002 | Suenaga et al. | |
| 2002/0179434 A1 | 12/2002 | Dai et al. | |
| 2003/0017379 A1 | 1/2003 | Menashi | |
| 2003/0089899 A1 | 5/2003 | Lieber et al. | |
| 2004/0026684 A1 | 2/2004 | Empedocles | |
| 2004/0072045 A1 | 4/2004 | Kuromatsu et al. | |
| 2004/0087441 A1 | 5/2004 | Bock et al. | |
| 2004/0107869 A1 | 6/2004 | Velamakanni et al. | |
| 2004/0121219 A1 | 6/2004 | Mei et al. | |
| 2005/0009696 A1 | 1/2005 | Mao et al. | |
| 2005/0066883 A1 | 3/2005 | Dubrow et al. | |
| 2005/0181195 A1 | 8/2005 | Dubrow | |
| 2006/0217265 A1 | 9/2006 | Tada et al. | |
| 2007/0099066 A1 | 5/2007 | Okumura et al. | |
| 2007/0212538 A1 | 9/2007 | Niu | |
| 2008/0220296 A1 | 9/2008 | Eichhorn et al. | |
| 2008/0280169 A1 | 11/2008 | Niu et al. | |
| 2011/0008707 A1 * | 1/2011 | Muraoka et al. | 429/483 |
| 2011/0053020 A1 * | 3/2011 | Norton et al. | 429/425 |
| 2011/0275005 A1 * | 11/2011 | Zhu et al. | 429/482 |
| 2013/0330651 A1 * | 12/2013 | Thompsett et al. | 429/482 |

FOREIGN PATENT DOCUMENTS

| | | |
|---|---|---|
| JP | 2003-200052 A | 7/2003 |
| JP | 2004-079438 A | 3/2004 |
| JP | 2004-186049 | 7/2004 |
| JP | 2005-203332 A | 7/2005 |
| JP | 2006-277992 A | 10/2006 |
| JP | 2007-084390 A | 4/2007 |
| JP | 2007-115471 A | 5/2007 |
| JP | 2007-123043 A | 5/2007 |
| JP | 2007-287648 A | 11/2007 |
| JP | 2008-153146 A | 7/2008 |
| WO | WO 01/03208 A1 | 1/2001 |
| WO | WO 02/17362 A2 | 2/2002 |
| WO | WO 02/48701 A2 | 6/2002 |

OTHER PUBLICATIONS

International Preliminary Report on Patentability mailed Jul. 28, 2011 in International Application No. PCT/US2009/61684, International Searching Authority (ISA/US), Alexandria, Virginia, 27 pages.
Non-Final Office Action mailed Apr. 25, 2013 in U.S. Appl. No. 13/124,790, Yimin Zhu et al., filed Apr. 18, 2011, 8 pages.
Requirement for Restriction/Election mailed Feb. 26, 2013 in U.S. Appl. No. 13/124,790, Yimin Zhu et al., filed Apr. 18, 2011, 11 pages.
English-Language Abstract for Japanese Patent Publication No. 2000-243411 A, published Sep. 8, 2000; 1 page.
English-Language Abstract for Japanese Patent Publication No. 2005-203332 A, published Jul. 28, 2005; 1 page.
International Search Report directed to related International Patent Application No. PCT/US2009/061684, International Searching Authority (ISA/US), Alexandria, Virginia, dated Dec. 14, 2009; 2 pages.
International Search Report directed to related International Patent Application No. PCT/US2009/061686, International Searching Authority (ISA/US), Alexandria, Virginia, dated Feb. 8, 2010; 4 pages.
Co-pending U.S. Appl. No. 13/124,790, inventors Yimin Zhu et al., filed Apr. 18, 2011 (Not Published).
11th Annual Small Fuel Cells 2009 Conference, Orland, FL.
English language Abstract of Japanese Patent Publication No. 2004-186049 A, published Jul. 2, 2004, the Japanese Patent Office; 1 page.
International Preliminary Report on Patentability directed to related International Patent Application No. PCT/US2009/061686, International Searching Authority (ISA/US), Alexandria, Virginia, dated Feb. 22, 2011; 8 pages.
English language abstract and translation of Japanese Patent Publication No. 2890486 B2, published May 17, 1999, the Japanese Patent Office; 15 pages. (Machine Translation).
English language abstract and translation of Japanese Patent Publication No. 2007-287648 A, published Nov. 1, 2007, the Japanese Patent Office; 14 pages. (Machine Translation).
Advisory Action mailed Nov. 5, 2013 for U.S. Appl. No. 13/124,790, filed Jul. 11, 2011; 4 pages.
Final Office Action mailed Aug. 15, 2013 in U.S. Appl. No. 13/124,790, Yimin Zhu et al., filed Jul. 11, 2011, 8 pages.
English-Language Abstract for Japanese Patent Publication No. 2004-079438A, published Mar. 11, 2004; 1 page.
English-Language Abstract for Japanese Patent Publication No. 2007-084390A, published Apr. 5, 2007; 1 page.
English-Language Abstract for Japanese Patent Publication No. 2007-115471A, published May 10, 2007; 1 page.
English-Language Abstract for Japanese Patent Publication No. 2007-123043A, published May 17, 2007; 1 page.
English-Language Abstract for Japanese Patent Publication No. 2008-153146A, published Jul. 3, 2008; 1 page.
Baddour, C.E., et al., "Carbon nanotube synthesis: A review," Int. J. Chem. React. Eng. 3(R3):1-20 (2005).
Bjork, M.T. et al., "One-dimensional steeplechase for electrons realized," Nano Letters 2(2):86-89 (2002).
Cao, Y.W. et al., "Growth and Properties of Semiconductor Core/Shell Nanocrystals with InAs Cores," J. Am. Chem. Soc. 122:9692-9702 (2000).
Cui, Y. et al. "Diameter-controlled synthesis of single-crystal silicon nanowires," Appl. Phys. Lett. 78(15):2214-2216 (2001).
Cui, Y. et al. "Doping and electrical transport in silicon nanowires," J. Phys. Chem. B 104(22):5213-5216 (2000).
Dabbousi, B.O. et al., "(CdSe)ZnS core-shell quantum dots: Synthesis and characterization of a size series of highly luminescent nanocrystallites," J. Phys. Chem. B 101(46):9463-9475 (1997).
De Jong, K.P., et al., "Carbon Nanofibers: Catalytic Synthesis and Applications," Catal. Rev.—Sci. Eng. 42(4):481-510 (2000).
Duan, X. et al., "General synthesis of compound semiconductor nanowires," Adv. Mater. 12(4):298-302 (2000).
Greene, L., et al., "Low-temperature wafer scale production of ZnO nanowire arrays," Chem. Int. Ed. 42:3031-3034 (2003).
Gudiksen, M.S. et al., "Diameter-selective synthesis of semiconductor nanowires," J. Am. Chem. Soc. 122:8801-8802 (2000).
Gudiksen, M.S. et al., "Growth of nanowire superlattice structures for nanoscale photonics and electronics," Nature 415:617-620 (2002).
Gudiksen, M.S. "Synthetic control of the diameter and length of single crystal semiconductor nanowires," J. Phys. Chem. B 105:4062-4064 (2001).

(56) References Cited

OTHER PUBLICATIONS

Jun, Y.-W. et al., "Controlled synthesis of multi-armed CdS nanorod architectures using monosurfactant system," J. Am. Chem. Soc. 123(21):5150-5151 (2001).

Liu, C. et al., "Sol-Gel synthesis of free-standing ferroelectric lead zirconate titanate nanoparticles," J. Am. Chem. Soc. 123(18):4344-4345 (2001).

Manna, L. et al. "Epitaxial growth and photochemical annealing of graded CdS/ZnS shells on colloidal CdSe nanorods," J. Am. Chem. Soc. 124:7136-7145 (2002).

Manna, L. et al., "Synthesis of soluble and processable rod-, arrow-, teardrop-, and tetrapod-shaped CdSe nanocrystals," J. Am. Chem. Soc. 122:12700-12706 (2000).

Morales, A.M. et al., "A laser ablation method for the synthesis of crystalline semiconductor nanowires," Science 279(9):208-211 (1998).

Neburchilov, V., et al., "A review of polymer electrode membranes for direct methanol fuel cells," J. Power Sources 169:221-238 (2007).

Peng, X. et al., "Epitaxial growth of highly luminescent CsDe/CdS core/shell nanocrystals with photostability and electronic accessibility," J. Am. Chem. Soc. 119(30):7019-7029 (1997).

Peng, X. et al., "Shape control of CdSe nanocrystals," Nature 404:59-61 (2000).

Puntes, V.F. et al., "Colloidal nanocyrstal shape and size control: the case of cobalt," Science 291:2115-2117 (2001).

Smitha, B. et al., "Solid polymer electrolyte membranes for fuel cell applications—a review," J. Membr. Sci. 259:10-26 (2005).

Urban, J.J. et al., "Synthesis of single-crystalline perovskite nanorods composed of varium titanate and strontium titanate," J. Am. Chem. Soc. 124(7):1186-1187 (2002).

Wu, Y. et al., "Block-by-block growth of single-crystalline Si/SiGe superlattice nanowires," Nano Letters 2:83-86 (2002).

Yun, W.S., et al., "Ferroelectric properties of individual barium titanate nanowires investigated by scanned probe microscopy," Nano Letters 2(2):447-450 (2002).

Non-Final Rejection mailed Jun. 19, 2014 for U.S. Appl. No. 13/124,790, filed Jul. 11, 2011; 10 pages.

* cited by examiner

ELECTROCHEMICAL CATALYSTS FOR FUEL CELLS

BACKGROUND OF THE INVENTION

1. Field of the Invention

The present invention relates to electrochemical catalyst particles, including nanoparticles, which can be used membrane electrode assemblies and in fuel cells.

2. Background of the Invention

Fuel cells are devices that convert the chemical energy of fuels, such as hydrogen and methanol, directly into electrical energy. The basic physical structure or building block of a fuel cell consists of an electrolyte layer in contact with a porous anode and cathode on either side. In a typical fuel cell, a fuel (e.g., methanol or hydrogen) is fed to an anode catalyst that converts the fuel molecules into protons (and carbon dioxide for methanol fuel cells), which pass through the proton exchange membrane to the cathode side of the cell. At the cathode catalyst, the protons (e.g., hydrogen atoms without an electron) react with the oxygen ions to form water. By connecting a conductive wire from the anode to the cathode side, the electrons stripped from fuel, hydrogen or methanol on the anode side, can travel to the cathode side and combine with oxygen to form oxygen ions, thus producing electricity. Fuel cells operating by electrochemical oxidation of hydrogen or methanol fuels at the anode and reduction of oxygen at the cathode are attractive power sources because of their high conversion efficiencies, low pollution, lightweight design, and high energy density.

In direct methanol fuel cells (DMFCs), the liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

Anode Reaction: $CH_3OH + H_2O \rightarrow CO_2 + 6H^+ + 6e^-$ 

Cathode Reaction: $3/2O_2 + 6H^+ + 6e^- \rightarrow 3H_2O$ 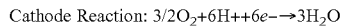

Overall Cell Reaction: $CH_3OH + 3/2O_2 \rightarrow CO_2 + 2H_2O$ 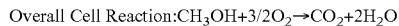

Initially developed in the early 1990s, DMFCs were not embraced because of their low efficiency and power density, as well as other problems. Improvements in catalysts and other recent developments have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as cellular phones, laptops, cameras and other consumer products, up to automobile power plants. One of the drawbacks of the DMFC is that the low-temperature oxidation of methanol to hydrogen ions and carbon dioxide requires a more active catalyst, which typically means a larger quantity of expensive platinum (and/or ruthenium) catalyst is required.

A DMFC typically requires the use of ruthenium (Ru) as a catalyst component because of its high carbon monoxide (CO) tolerance and reactivity. Ru disassociates water to create an oxygenated species that facilitates the oxygenation of CO, which is produced from the methanol, to $CO_2$. Some existing DMFCs use nanometer-sized bimetallic Pt:Ru particles as the electro-oxidation catalyst because of the high surface area to volume ratio of the particles. The Pt/Ru nanoparticles are typically provided on a carbon support (e.g., carbon black, fullerene soot, or desulfurized carbon black) to yield a packed particle composite catalyst structure. Most commonly used techniques for creating the Pt:Ru carbon packed particle composite are the impregnation of a carbon support in a solution containing platinum and ruthenium chlorides followed by thermal reduction.

A multi-phase interface or contact is established among the fuel cell reactants, electrolyte, active Pt:Ru nanoparticles, and carbon support in the region of the porous electrode. The nature of this interface plays a critical role in the electrochemical performance of the fuel cell. Often, only a portion of catalyst particle sites in packed particle composites are utilized because other sites are either not accessible to the reactants, or not connected to the carbon support network (electron path) and/or electrolyte (proton path). In addition, there is a need for catalysts with increased activity, including Pt:Ru catalysts with improved properties for use in fuel cells.

SUMMARY OF THE INVENTION

In one embodiment, the present invention provides electrochemical catalyst nanoparticles. Suitably, the nanoparticles comprising one or more metals, wherein the atomic ratio of oxygen in the nanoparticles to one of the metals in the nanoparticles is in the range of about 3 to about 6 (suitably, about 3.6 to about 5, about 3.6 to about 4, or about 3.6). Suitably, the nanoparticles have a size of about 1 nm to about 10 nm.

In exemplary embodiments, electrochemical catalyst nanoparticles comprise a metal that comprises one or more of Pt, Au, Pd, Ru, Re, Rh, Os, Ir, Fe, Co, Ni, Cu, Ag, V, Cr, Mo, W and alloys or mixtures thereof. Suitably, the nanoparticles comprise Pt:Ru. In suitable such embodiments, the ratio of oxygen to Ru is in the range of about 3.6 to about 6, the percentage of metallic ruthenium is less than about 30%, and the percentage of metallic platinum is about 70% to about 90%. In an exemplary embodiment, the present invention provides Pt:Ru electrochemical catalyst nanoparticles, wherein the atomic ratio of oxygen to Ru in the nanoparticle is in the range of about 3 to about 6, the percentage of metallic ruthenium is less than about 30%, and the percentage of metallic platinum is about 70% to about 90%. The maximum peak of the Pt:Ru nanoparticles of the present invention in a range of 2θ=30° to 44° is located in a range of not less than 33.0° to less than 37.0°. Suitably, the Pt:Ru nanoparticles of the present invention have a crystal size of not more than 3 nm. The nanoparticles also suitably comprise nitrogen.

In further embodiments, the present invention provides supported electrochemical catalysts. Exemplary supports for the catalysts include carbon black, carbon powder (including cross-linked carbon powder), nanowires, and carbon powder-nanowire (also called nanowire-powder) composites. Suitably, the electrochemical catalysts comprise a nanoparticle comprising one or more metals, wherein the atomic ratio of oxygen in the nanoparticle to one of the metals in the nanoparticle is in the range of about 3 to about 6. Exemplary sizes and compositions of the nanoparticles are described throughout. In suitable embodiments, the nanowires of the nanowire-supported electrochemical catalysts are selected from the group consisting of C, $RuO_2$, SiC, GaN, $TiO_2$, $SnO_2$, $WC_x$, $MoC_x$, ZrC, $WN_x$, and $MoN_x$ nanowires, wherein x is a positive integer. In exemplary embodiments, the present invention provides supported electrochemical catalyst, the electrochemical catalyst comprising a Pt:Ru nanoparticle, wherein the atomic ratio of oxygen to Ru in the nanoparticle is about 3 to about 6, the percentage of metallic ruthenium is less than about 30%, and the percentage of metallic platinum is about 70% to about 90%. The maximum peak of the Pt:Ru nanoparticles of the present invention in a range of 2θ=30° to 44° is located in a range of not less than 33.0° to less than 37.0°. Suitably, the Pt:Ru nanoparticles of the present invention have a crystal size of not more than 3 nm.

In further embodiments, the present invention provides membrane electrode assemblies (MEAs) comprising the electrochemical catalyst nanoparticles of the present invention, suitably carbon black, carbon powder (including cross-linked carbon powder), nanowires (e.g., carbon nanotubes and carbon nanofibers), and nanowire-powder composites, supported electrochemical catalysts. In addition, the present invention provides fuel cells comprising the MEAs.

The present invention also provides methods of preparing supported Pt:Ru electrochemical catalyst nanoparticles, including carbon black, carbon powder (including cross-linked carbon powder), nanowires (e.g., carbon nanotubes and carbon nanofibers), and nanowire-powder composites, supported catalysts. Suitably, the atomic ratio of oxygen to Ru in the nanoparticles is in the range of about 3 to about 6, the percentage of metallic ruthenium is less than about 30%, and the percentage of metallic platinum is about 70% to about 90%. The methods suitably comprise providing a Pt:Ru colloid solution prepared by combining $RuCl_3 xH_2O$, ethylene glycol, $H_2PtCl_6 xH_2O$ and NaOH. This solution is then added to a support, e.g., a suspension of nanowires (e.g., carbon-comprising nanowires) to prepare a nanowire-Pt:Ru colloid solution. The pH of the nanowire-Pt:Ru colloid solution is then reduced, and then the nanowire-supported Pt:Ru electrochemical catalyst nanoparticles are recovered. Suitably, the pH is reduced pH 11, then to pH 7, then to pH 4, then to pH 1, over the course of about 24 hours.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

Figure 1:
FIG. 1 shows transmission electron micrograph images of 1.67 nm Pt:Ru (1:1) nanoparticles deposited on the surface of nanographite coated nanowires at two different magnifications.

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanowires, though other similar structures are also encompassed herein.

It should be appreciated that although nanowires (e.g., carbon nanotubes and carbon nanofibers) are frequently referred to, the techniques described herein are also applicable to other nanostructures, such as nanorods, nanotubes, nanotetrapods, nanoribbons and/or combinations thereof. It should further be appreciated that a carbon-based layer (including non-crystalline carbon, such as non-basal plane carbon, as well as crystalline nanographite coatings) can be produced on the surface of a wide range of materials, including, but not limited to, conventional fibers and fiber structures; flat, curved and irregular surfaces; and various materials such as metal, semiconductors, ceramic foams, reticulated metals and ceramics.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In another embodiment, the nanostructure comprises a core of a first material and at least one shell of a second (or third etc.) material, where the different material types are distributed radially about the long axis of a nanowire, a long axis of an arm of a branched nanocrystal, or the center of a nanocrystal, for example. A shell need not completely cover the adjacent materials to be considered a shell or for the nanostructure to be considered a heterostructure. For example, a nanocrystal characterized by a core of one material covered with small islands of a second material is a heterostructure. In other embodiments, the different material types are distributed at different locations within the nanostructure. For example, material types can be distributed along the major (long) axis of a nanowire or along a long axis or arm of a branched nanocrystal. Different regions within a heterostructure can comprise entirely different materials, or the different regions can comprise a base material.

As used herein, a "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires (e.g., carbon nanotubes and carbon nanofibers), nanorods, nanotubes, branched nanocrystals, nanotetrapods, tripods, bipods, nanocrystals, nanodots, quantum dots, nanoparticles, branched tetrapods (e.g., inorganic dendrimers), and the like. Nanostructures can be substantially homogeneous in material properties, or in other embodiments can be heterogeneous (e.g., heterostructures). Nanostructures can be, for example, substantially crystalline, substantially monocrystalline, polycrystalline, amorphous, or combinations thereof. In one aspect, one of the three dimensions of the nanostructure has a dimension of less than about 500 nm, for example, less than about 200 nm, less than about 100 nm, less than about 50 nm, or even less than about 20 nm.

As used herein, the term "nanowire" generally refers to any elongated conductive or semiconductive material (or other material described herein) that includes at least one cross sectional dimension that is less than 500 nm, and preferably, less than 100 nm, and has an aspect ratio (length:width) of greater than 10, preferably greater than 50, and more preferably, greater than 100.

The nanowires of this invention can be substantially homogeneous in material properties, or in other embodiments can be heterogeneous (e.g. nanowire heterostructures). The nanowires can be fabricated from essentially any convenient material or materials, and can be, e.g., substantially crystalline, substantially monocrystalline, polycrystalline, amorphous, or combinations thereof. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be e.g., curved or bent, over the entire length of its long axis or a portion thereof. In other embodiments, a nanowire or a portion thereof can exhibit two- or three-dimensional quantum confinement.

Examples of such nanowires include semiconductor nanowires as described in Published International Patent Application Nos. WO 02/17362, WO 02/48701, and WO 01/03208, carbon nanotubes, carbon nanofibers and other elongated conductive or semiconductive structures of like dimensions, which are incorporated herein by reference.

As used herein, the term "nanorod" generally refers to any elongated conductive or semiconductive material (or other material described herein) similar to a nanowire, but having an aspect ratio (length:width) less than that of a nanowire. Note that two or more nanorods can be coupled together along their longitudinal axis so that the coupled nanorods span all the way between electrodes. Alternatively, two or more nanorods can be substantially aligned along their longitudinal axis, but not coupled together, such that a small gap exists between the ends of the two or more nanorods. In this case, electrons can flow from one nanorod to another by hopping from one nanorod to another to traverse the small gap. The two or more nanorods can be substantially aligned, such that they form a path by which electrons can travel between electrodes.

A wide range of types of materials for nanowires, nanorods, nanotubes and nanoribbons can be used, including semiconductor material selected from, e.g., Si, Ge, Sn, Se, Te, B, C (including diamond), P, B—C, B—P($BP_6$), B—Si, Si—C, Si—Ge, Si—Sn and Ge—Sn, SiC, BN, BP, BAs, MN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, (Cu, Ag)(Al, Ga, In, Tl, Fe)(S, Se, Te)$_2$, $Si_3N_4$, $Ge_3N_4$, $Al_2O_3$, (Al, Ga, In)$_2$ (S, Se, Te)$_3$, $Al_2CO$, and an appropriate combination of two or more such semiconductors.

The nanowires can also be formed from other materials such as metals such as gold, nickel, palladium, iradium, cobalt, chromium, aluminum, titanium, tin and the like, metal alloys, polymers, conductive polymers, ceramics, and/or combinations thereof. Other now known or later developed conducting or semiconductor materials can be employed.

Nanowires of the present invention may also be comprised of organic polymers, ceramics, inorganic semiconductors such as carbides and nitrides, and oxides (such as $TiO_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. As used throughout, the subscript "x," when used in chemical formulae, refers to a whole, positive integer (e.g., 1, 2, 3, 4, 5, 6, 7, 8, 9, 10, etc). It is suitable that the nanowires be made from a material that is resistant to degradation in a weak acid so that the nanowires are compatible with the reactants of a variety of different fuel cells. Nanowires according to this invention can include, or can expressly exclude, carbon nanotubes, and, in certain embodiments, exclude "whiskers" or "nanowhiskers", particularly whiskers having a diameter greater than 100 nm, or greater than about 200 nm.

In other aspects, the semiconductor may comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type dopant selected from a group consisting of: Si, Ge, Sn, S, Se and Te. Other now known or later developed dopant materials can be employed.

Additionally, the nanowires or nanoribbons can include carbon nanotubes, or nanotubes formed of conductive or semiconductive organic polymer materials, (e.g., pentacene, and transition metal oxides).

It should be understood that the spatial descriptions (e.g., "above", "below", "up", "down", "top", "bottom", etc.) made herein are for purposes of illustration only, and that devices of the present invention can be spatially arranged in any orientation or manner.

Nanomaterials have been produced in a wide variety of different ways. For example, solution based, surfactant mediated crystal growth has been described for producing spherical inorganic nanomaterials, e.g., quantum dots, as well as elongated nanomaterials, e.g., nanorods and nanotetrapods. Other methods have also been employed to produce nanomaterials, including vapor phase methods. For example, silicon nanocrystals have been reportedly produced by laser pyrolysis of silane gas.

Other methods employ substrate based synthesis methods including, e.g., low temperature synthesis methods for producing, e.g., ZnO nanowires as described by Greene et al. ("Low-temperature wafer scale production of ZnO nanowire arrays," L. Greene, M. Law, J. Goldberger, F. Kim, J. Johnson, Y. Zhang, R. Saykally, P. Yang, Angew. Chem. Int. Ed. 42, 3031-3034, 2003), and higher temperature VLS methods that employ catalytic gold particles, e.g., that are deposited either as a colloid or as a thin film that forms a particle upon heating. Such VLS methods of producing nanowires are described in, for example, Published International Patent Application No. WO 02/017362, the full disclosure of which is incorporated herein by reference in its entirety for all purposes.

Nanostructures can be fabricated and their size can be controlled by any of a number of convenient methods that can be adapted to different materials. For example, synthesis of nanocrystals of various composition is described in, e.g., Peng et al. (2000) "Shape Control of CdSe Nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process;" U.S. Pat. No. 5,505,928 to Alivisatos et al. (Apr. 9, 1996) entitled "Preparation of III-V semiconductor nanocrystals;" U.S. Pat. No. 5,751,018 to Alivisatos et al. (May 12, 1998) entitled "Semiconductor nanocrystals covalently bound to solid inorganic surfaces using self-assembled monolayers;" U.S. Pat. No. 6,048,616 to Gallagher et al. (Apr. 11, 2000) entitled "Encapsulated quantum sized doped semiconductor particles and method of manufacturing same;" and U.S. Pat. No. 5,990,479 to Weiss et al. (Nov. 23, 1999) entitled "Organo luminescent semiconductor nanocrystal probes for biological applications and process for making and using such probes."

Growth of nanowires having various aspect ratios, including nanowires with controlled diameters, is described in, e.g., Gudiksen et al. (2000) "Diameter-selective synthesis of semiconductor nanowires" *J. Am. Chem. Soc.* 122, 8801-8802; Cui et al. (2001) "Diameter-controlled synthesis of single-crystal silicon nanowires" *Appl. Phys. Lett.* 78, 2214-2216; Gudiksen et al. (2001) "Synthetic control of the diameter and length of single crystal semiconductor nanowires" *J. Phys. Chem. B* 105, 4062-4064; Morales et al. (1998) "A laser ablation method for the synthesis of crystalline semiconductor nanowires" *Science* 279, 208-211; Duan et al. (2000) "General synthesis of compound semiconductor nanowires" *Adv. Mater.* 12, 298-302; Cui et al. (2000) "Doping and electrical transport in silicon nanowires" *J. Phys. Chem. B* 104, 5213-5216; Peng et al. (2000) "Shape control of CdSe nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process"; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods;" Urbau et al. (2002) "Synthesis of single-crystalline perovskite nanowires composed of barium titanate and strontium titanate" *J. Am. Chem. Soc.*, 124, 1186; Yun et al. (2002) "Ferroelectric Properties of Individual Barium Titanate Nanowires Investigated by Scanned Probe Microscopy" *Nanoletters* 2, 447; C. E. Baddour and C. Briens (2005) "Carbon nanotube synthesis: A review" International Journal of Chemical Reactor Engineering 3 R3; and K. P. De Jong and J. W. Geus (2000) "Carbon nanofibers: Catalytic Synthesis and Applications" 42 481.

In certain embodiments, the nanowires of the present invention are produced by growing or synthesizing these elongated structures on substrate surfaces. By way of example, published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, *Angew. Chem. Int. Ed.* 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, Science, V.279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" *J. Am. Chem. Soc.* 123, 5150-5151; and Manna et al. (2000) "Synthesis of Soluble and Processable Rod-, Arrow-, Teardrop-, and Tetrapod-Shaped CdSe Nanocrystals" *J. Am. Chem. Soc.* 122, 12700-12706.

Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys;" U.S. Pat. No. 6,413,489 to Ying et al. (Jul. 2, 2002) entitled "Synthesis of nanometer-sized particles by reverse micelle mediated techniques;" and Liu et al. (2001) "Sol-Gel Synthesis of Free-Standing Ferroelectric Lead Zirconate Titanate Nanoparticles" *J. Am. Chem. Soc.* 123, 4344. Synthesis of nanoparticles is also described in the above citations for growth of nanocrystals, nanowires, and branched nanowires, where the resulting nanostructures have an aspect ratio less than about 1.5.

Synthesis of core-shell nanostructure heterostructures, namely nanocrystal and nanowire (e.g., nanorod) core-shell heterostructures, are described in, e.g., Peng et al. (1997) "Epitaxial growth of highly luminescent CdSe/CdS core/shell nanocrystals with photostability and electronic accessibility" *J. Am. Chem. Soc.* 119, 7019-7029; Dabbousi et al. (1997) "(CdSe)ZnS core-shell quantum dots: Synthesis and characterization of a size series of highly luminescent nanocrysallites" *J. Phys. Chem. B* 101, 9463-9475; Manna et al. (2002) "Epitaxial growth and photochemical annealing of graded CdS/ZnS shells on colloidal CdSe nanorods" *J. Am. Chem. Soc.* 124, 7136-7145; and Cao et al. (2000) "Growth and properties of semiconductor core/shell nanocrystals with InAs cores" *J. Am. Chem. Soc.* 122, 9692-9702. Similar approaches can be applied to growth of other core-shell nanostructures.

Growth of nanowire heterostructures in which the different materials are distributed at different locations along the long axis of the nanowire is described in, e.g., Gudiksen et al. (2002) "Growth of nanowire superlattice structures for nanoscale photonics and electronics" *Nature* 415, 617-620; Bjork et al. (2002) "One-dimensional steeplechase for electrons realized" *Nano Letters* 2, 86-90; Wu et al. (2002) "Block-by-block growth of single-crystalline Si/SiGe superlattice nanowires" *Nano Letters* 2, 83-86; and U.S. patent application 60/370,095 (Apr. 2, 2002) to Empedocles entitled "Nanowire heterostructures for encoding information." Similar approaches can be applied to growth of other heterostructures.

As described herein, and throughout co-assigned provisional Patent Application No. 60/738,100, filed Nov. 21, 2005, the entire contents of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding catalyst (and/or polymer electrolyte). For example, in one embodiment, a multi-layer or multi-walled carbon nanotube (MWNT) can be formed in which the outermost shell layer is converted to silicon carbide to provide a surface (SiC) to bind catalyst (and/or polymer electrolyte) and a conductive carbon nanotube core to impart the necessary conductivity. In alternative embodiments, the core may consist of heavily doped material such as doped silicon, and a shell of a carbide, nitride etc. material (e.g., SiC) may then be formed on the core. The use of silicon as the core material leverages the extensive experience and infrastructure known for fabricating silicon nanowires. A carbide shell, such as SiC, WC, MoC or mixed carbide (e.g. WSiC) may be formed around the core material using a controlled surface reaction. SiC, WC and MoC are known for their high conductivity and chemical stability. In addition, these materials have been shown to have catalytic properties similar to those of precious metals, such as Pt, for methanol oxidation, and therefore may provide further performance enhancements in the nanowire bird's nest MEA. The precursor materials for the shell may be deposited on the core nanowire surface (e.g., silicon) by atomic layer deposition (ALD) and then converted to the carbide by high-temperature carbothermal reduction, for example.

Exemplary nanowires that can be used in the practice of the present invention include carbon-comprising nanowires, such as those disclosed in U.S. Patent Application Publication No. 2007-0212538 and U.S. Patent Application Publication No. 2008-0280169, the disclosures of each of which are incorporated by reference herein in their entireties for all purposes. As disclosed in U.S. Patent Application Publication No. 2007-0212538 and U.S. Patent Application Publication No. 2008-0280169, in suitable embodiments, the nanowires can form an interconnected nanowire network, comprising a plurality of nanowire structures, wherein carbon-based structures, in the form of nanographitic plates, attached to the various nanowire cores connect the nanowire structures.

The structure of densely packed nanowires, with or without interconnecting nanographitic plates, is also referred to throughout as a "bird's nest" structure. This arrangement takes the form of a porous structure, wherein the size of pores between the nanowires and nanographitic plates are suitably mesopores and macropores. As used herein the term "mesopores" refers to pores that are larger than micropores (micropores are defined as less than about 2 nm in diameter), but smaller than macropores (macropores are defined as greater than about 50 nm in diameter), and therefore have a pore size in the range of greater than about 30 nm to less than about 200 nm in diameter. Suitably, interconnected nanowire network 300 will be substantially free of micropores, that is, less than about 0.1% of the pores will be micropores (i.e., less than about 2 nm in diameter).

Electrochemical Catalysts

In one embodiment, the present invention provides electrochemical catalyst nanoparticles (also called nanoparticles, catalyst nanoparticles, and catalysts throughout). Suitably, the electrochemical catalyst nanoparticles comprise one or more metals. Using the methods described herein, the electrochemical catalyst nanoparticles produced have an atomic ratio of oxygen in the nanoparticle, to one of the metals in the nanoparticle in the range of about 2 to about 6. As used herein "atomic ratio" is the ratio of the number of atoms of one element to another. For example, the atomic ratio of oxygen in the nanoparticles to one of the metals in the nanoparticles means the ratio of the number of atoms of oxygen in the nanoparticles to the number of atoms of one of the metals in the nanoparticles. Suitably, the ratio is measured as the number of atoms of oxygen in the nanoparticles to the main constituent metal of the nanoparticles.

Suitably, the atomic ratio of oxygen in the nanoparticle to one or more of the metals in the nanoparticle is in the range of about 2.5 to about 6, for example, about 3 to about 6, about 3.1 to about 6, about 3.2 to about 6, about 3.3 to about 6, about 3.4 to about 6, about 3.5 to about 6, about 3.6 to about 6, about 3.7 to about 6, about 3.8 to about 6, about 3.9 to about 6, about 4 to about 6, about 4.1 to about 6, about 4.2 to about 6, about 4.3 to about 6, about 4.4 to about 6, about 4.5 to about 6, about 4.6 to about 6, about 4.7 to about 6, about 4.8 to about 6, about 4.9 to about 6, about 5 to about 6, about 5.1 to about 6, about 5.2 to about 6, about 5.3 to about 6, about 5.4 to about 6, about 5.5 to about 6, about 5.6 to about 6, about 5.7 to about 6, about 5.8 to about 6, or about 5.9 to about 6. As used herein, the term "about" when referring to a numerical value includes ±10% of that value. For example "about 5" includes the range of 4.5 to 5.5. In further embodiments, the atomic ratio of oxygen in the nanoparticle to one or more of the metals in the nanoparticle is in the range of about 3 to about 5, for example about 3.1 to about 5, about 3.2 to about 5, about 3.3 to about 5, about 3.4 to about 5, about 3.5 to about 5, about 3.6 to about 5, about 3.7 to about 5, about 3.8 to about 5, about 3.9 to about 5, about 4.0 to about 5, about 4.1 to about 5, about 4.2 to about 5, about 4.3 to about 5, about 4.4 to about 5, about 4.5 to about 5, about 4.6 to about 5, about 4.7 to about 5, about 4.8 to about 5, about 4.9 to about 5, or in the range of about 3 to about 4, for example, about 3.1 to about 4, about 3.2 to about 4, about 3.3 to about 4, about 3.4 to about 4, about 3.5 to about 4, about 3.6 to about 4, about 3.7 to about 4, about 3.8 to about 4, about 3.9 to about 4, or about 3.6. According to an embodiment of the present invention, the atomic ratio of oxygen in the nanoparticle to one or more of the metals in the nanoparticle is in a range of more than 3 to not more than 6, preferably not less than 3.6 to not more than 5.1, more preferably not less than 3.6 to not more than 5, further more preferably not less than 3.6 to not more than 4, especially preferably 3.6.

Suitably, at least one metal of the electrochemical catalyst nanoparticles is selected from the group comprising one or more of Pt, Au, Pd, Ru, Re, Rh, Os, Ir, Fe, Co, Ni, Cu, Ag, V, Cr, Mo, W and alloys or mixtures thereof. For example, the electrochemical catalyst nanoparticles suitably comprise mixtures of Pt and Ru, and are suitably Pt:Ru nanoparticles.

As used herein, a "nanoparticle" refers to a particle, crystal, sphere, or other shaped structure having at least one region or characteristic dimension with a dimension of less than about 500 nm, suitably less than about 200 nm, less than about 100 nm, less than about 50 nm, less than about 20 nm, or less than about 10 nm. Suitably, all of the dimensions of the electrochemical catalyst nanoparticles of the present invention are less than about 50 nm, and suitably have a size of about 1 nm to about 30 nm, or about 1 nm to about 20 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm, for example, about 1 nm, about 2 nm, about 3 nm, about 4 nm, about 5 nm, about 6 nm, about 7 nm, about 8 nm, about 9 nm, or about 10 nm.

Suitably, the electrochemical catalyst nanoparticles of the present invention comprise Pt:Ru, wherein the atomic ratio of oxygen to Ru is in the range of about 3 to about 6, suitably, about 3.6 to about 6, about 3.6 to about 5, about 3.6 to about 4, or about 3.6.

The electrochemical catalyst nanoparticles of the present invention in which the atomic ratio of oxygen to one or more metals of the electrochemical catalyst nanoparticles (e.g., Ru) is greater than about 3.0 (e.g., about 3.6 to about 6) show higher catalytic activity when utilized as electrodes (including anodes), including when utilized as part of a membrane electrode assembly (MEA) of a fuel cell, such as a methanol fuel cell.

Physical characterization performed on the electrochemical catalyst nanoparticles of the present invention (including x-ray diffraction and x-ray photoelectric spectroscopy) indicate that the nanoparticles comprise an atomic ratio of oxygen of greater than about 3, suitably greater than about 3.6, as compared to a metal of the nanoparticles (e.g., Ru).

In suitable embodiments, the electrochemical catalyst nanoparticles comprise ruthenium (Ru) as an oxide or hydroxide. Suitably, the percentage of metallic ruthenium in the nanoparticles is less than about 40% (with the remaining amount of ruthenium present as ruthenium oxide ($RuO_x$, where x ranges from 0 to 2); or ruthenium hydroxide ($Ru(OH)_x$, where x ranges from 0 to 3). As used herein, "metallic ruthenium" refers to ruthenium that is not in the form of an oxide or a hydroxide, but rather, is present in its reduced metallic form. Suitably, the percentage of metallic ruthenium in the electrochemical catalyst nanoparticles of the present invention is less than about 30% metallic ruthenium, less than about 25%, less than about 20%, less than about 15%, less than about 10%, for example, less than, or about, 9%, less than, or about, 8%, less than, or about, 7%, less than, or about, 6%, less than, or about, 5%, less than, or about, 4%, less than, or about, 3%, less than, or about, 2%, less than, or about, 1%, or 0% metallic ruthenium.

Suitably, the electrochemical catalyst nanoparticles comprise Pt:Ru, in which the percentage of metallic ruthenium is less than about 30%. In suitable embodiments in which Pt:Ru catalyst nanoparticles are utilized, the percentage of metallic platinum in the nanoparticles is about 60% to about 90%, suitably about 70% to about 90%, or about 80% to about 90%, for example, less than, or about, 87%.

In exemplary embodiments, the present invention provides Pt:Ru electrochemical catalyst nanoparticles, wherein the atomic ratio of oxygen to Ru in the nanoparticles is about 3 to about 6. In suitable nanoparticles, the percentage of metallic ruthenium in the nanoparticles is less than about 30%, and the percentage of metallic platinum in the nanoparticles is about 70% to about 90%. Suitably, the atomic ratio of oxygen to Ru in the Pt:Ru nanoparticles is about 3.6 to about 4, the percentage of metallic ruthenium is less than about 10%, and the percentage of metallic platinum is about 70% to about 90%.

Not wishing to be bound by any theory, it is believed that the presence of oxygen at a ratio of about 3.6 to 6, for example in the form of an oxide, such as ruthenium oxide in Pt:Ru nanoparticles, helps to reduce agglomeration or aggregation between the electrochemical catalyst nanoparticles, thereby helping to maintain the size of the nanoparticles of between about 1 nm to about 10 nm, suitably about 1 nm to about 5 nm, more suitably about 1 nm to about 3 nm. Reducing the amount of agglomeration between the nanoparticles, thereby allowing them to remain as separate nanoparticles with a size of about 1 nm to about 10 nm, leads to a higher mass activity of the nanoparticles when utilized in an anode or cathode, for example, in an MEA and/or a fuel cell (see FIG. 2A). In addition, in further embodiments, the nanoparticles comprise nitrogen, for example, in a percentage of about 0.5-5%, suitably about 0.5-2% or about 0.5-1.5% N. While not wishing to be bound by any theory, it is believed that about 0.5-5% nitrogen in the nanoparticles, for example Pt:Ru nanoparticles, helps to generate small sized particles.

The catalyst of the present invention can be analyzed by X-ray photoelectron spectroscopy (XPS) so as to find out chemical states of metal therein. A difference in bond energy reveals, for example, whether the catalyst is pure metal, oxide, or chloride. A peak shift is worked out on the basis of a main peak of C1s, as is generally performed, and the result of the measurement is a value corrected in accordance with the peak shift. Peaks of the chemical states are separated to work out area ratio therebetween, from which a composition ratio of the chemical states is determined. Further, information concerning valences and bonding states is obtained from energy shifts of the peaks.

The XPS can be carried out with a commercially available instrument, such as PHI Quantera SXM, for example. As to conditions under which it is carried out, the XPS measurement is not limited to specific conditions, and can be performed under conditions which are generally employed for XPS measurements.

The X-ray diffraction measurement of the present invention can be carried out under normal measurement conditions. For reference, measurement conditions employed in the Examples of the present invention are described below. Measurement was carried out by a continuous scanning method with a CuKα source (wavelength: 0.154 nm) as an X-ray source at a scan speed of 2°/min and a sampling pitch of 0.02°. A step-wise operation method can be used instead of the continuous scanning method. In this case, a step width is generally set to approximately 0.02°. If the particle size of catalyst metal is small, an obtained diffraction pattern becomes broad. This sometimes makes it difficult to distinguish between a peak and noise. However, the noise can be reduced by increasing the number of accumulation and prolonging a retention time. This makes it easy to distinguish the peak from the noise. Note that as for an X-ray diffraction pattern of platinum alone, the JCPDS (Joint Committee Powder Diffraction Standard) such as a JCPDS card #04-0802 can be a reference.

Figure 2A:
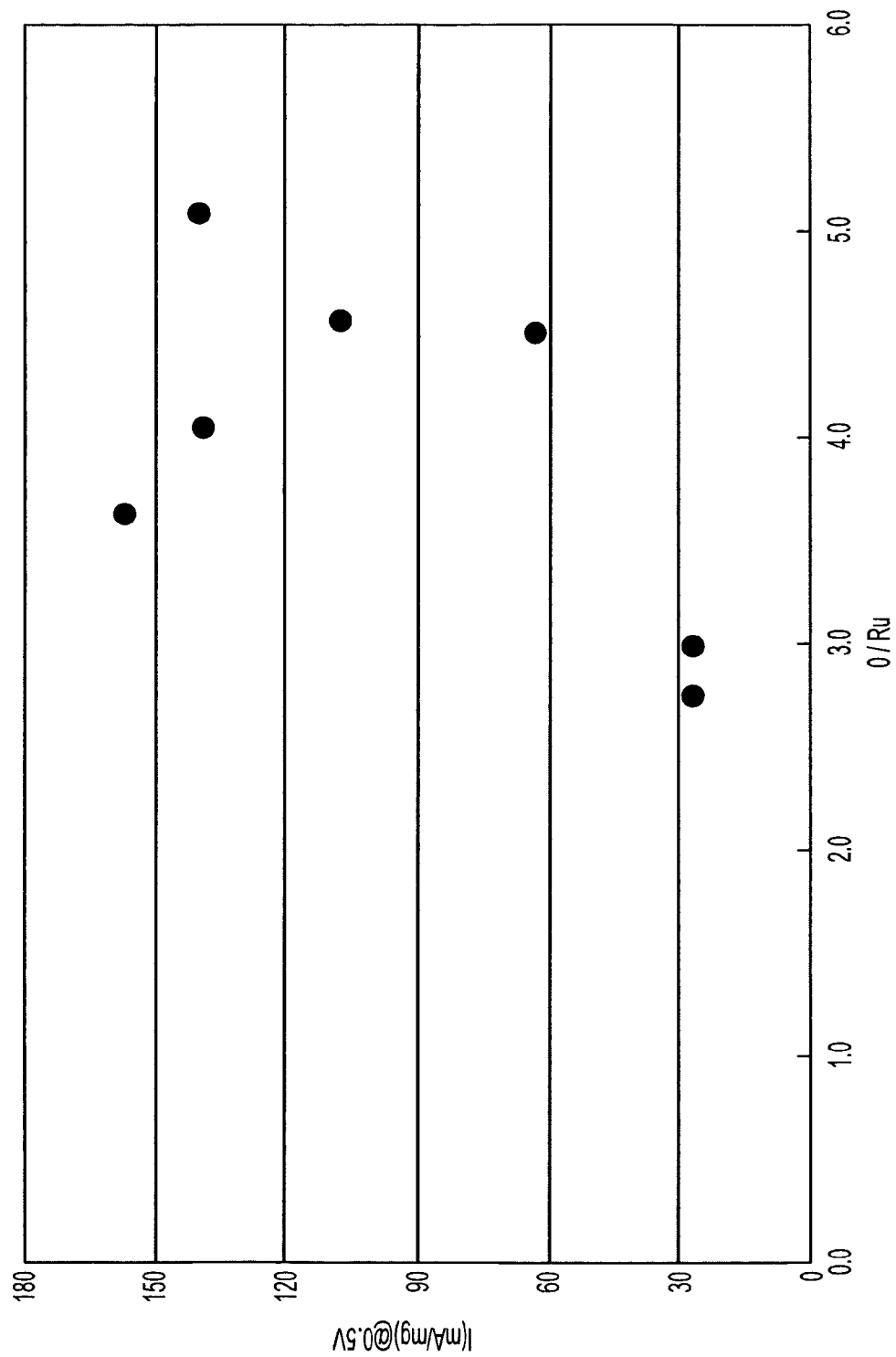
FIG. 2A shows a plot of the current (mA/mg) for Pt:Ru electrochemical catalyst nanoparticles a function of atomic ratio of oxygen to Ru.
Figure 2B:
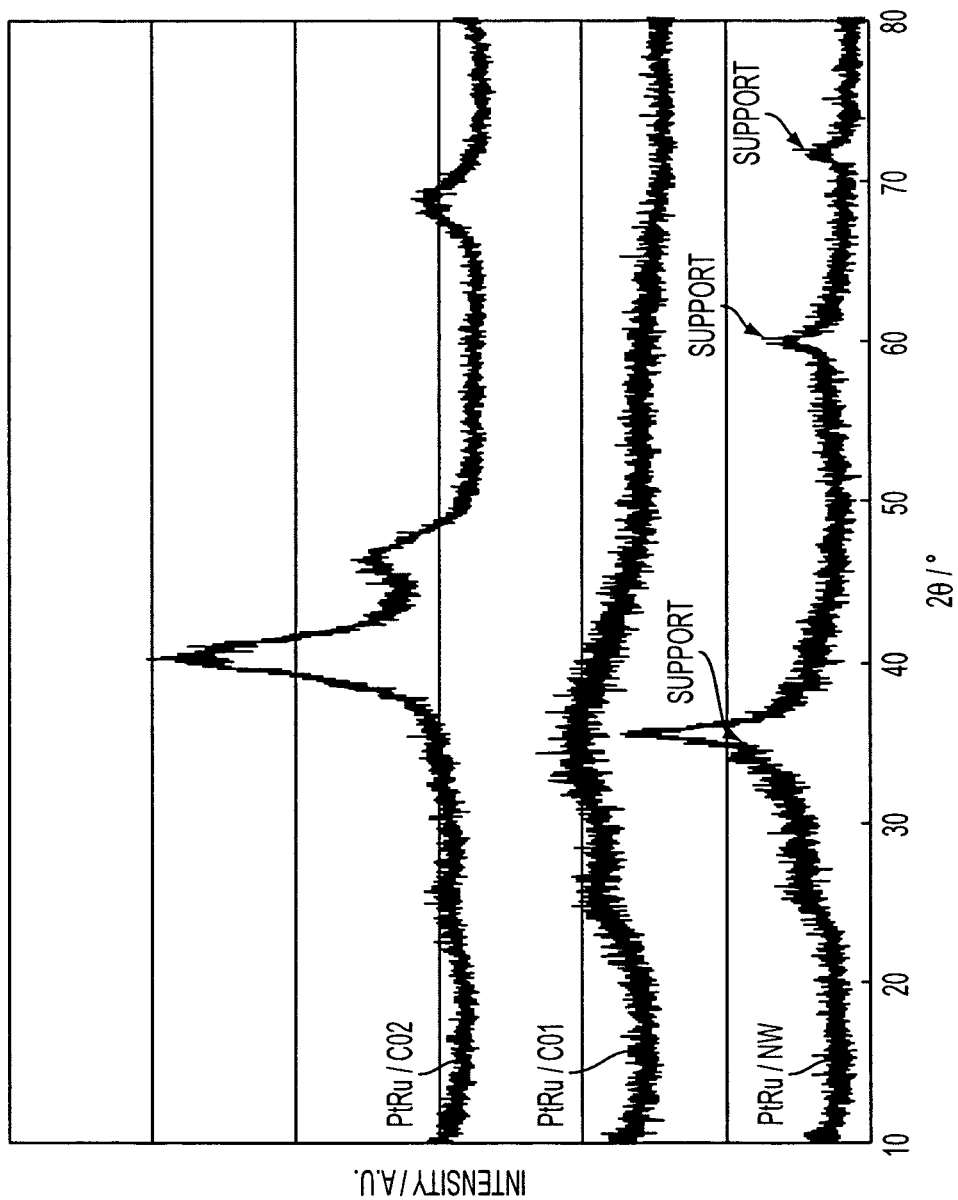
FIG. 2B shows the results of X-ray diffraction of Pt:Ru electrochemical catalyst nanoparticles of the present invention on carbon and nanowire supports.

As shown in FIG. 2B, a maximum peak of the Pt:Ru nanoparticles of the present invention in a range of 2θ=30° to 44° is located in a range of not less than 33.0° to less than 37.0°.

Peaks of the catalysts of the present invention are located at a lower angle side than that of an X-ray diffraction pattern of platinum alone, and the catalysts of the present invention have broad peaks. This can be seen as unique behavior of the catalysts of the present invention since a peak of a normal alloy catalyst shifts to a higher angle side than that of an X-ray diffraction pattern of platinum alone. It is not understood why the catalysts of the present invention are highly activated, but it is hypothesized that the reason lies, for example, in that (i) the Pt:Ru nanoparticles have a crystal size of not more than 3 nm and that (ii) the Pt:Ru nanoparticles have a structure similar to an amorphous material.

Suitably, the Pt:Ru nanoparticles of the present invention are not more than 3 nm in crystal size. Further, the Pt:Ru nanoparticles of the present invention suitably have a crystal size of not less than 1 nm. A crystal size of less than 1 nm likely causes agglomeration, and therefore is not preferable.

The electrochemical catalyst nanoparticles can be utilized in various membrane electrode assemblies and fuel cells as described herein. In exemplary embodiments, the nanoparticles can be attached or associated with various catalysts supports (also called "supports" herein), for example, a carbon support (e.g., carbon black (e.g., Cabot VULCAN® XC72), fullerene soot, or desulfurized carbon black). As used throughout, carbon black refers to the material produced by the incomplete combustion of petroleum products. Carbon black is a form of amorphous carbon that has an extremely high surface area to volume ratio.

In further embodiments, the present invention provides catalyst supports comprising carbon powders, including cross-linked carbon powder. In still further embodiments, the present invention provides nanowire-supported electrochemical catalysts (also called catalyst-associated nanowires throughout and in U.S. Patent Application Publication No. 2007-0212538 and U.S. Patent Application Publication No. 2008-0280169). In other embodiments, the catalyst supports of the present invention can comprise a composite of nanowires and carbon powder (called carbon powder-nanowire composites or nanowire-powder composites herein), including cross-linked carbon powder.

As described herein, the electrochemical catalysts of the present invention comprise nanoparticles comprising one or more metals, wherein the atomic ratio of oxygen in the nanoparticles to one or more of the metals in the nanoparticles is in the range of about 3 to about 6. As described throughout, suitably, the atomic ratio of oxygen to metal is in the range of about 3.6 to about 5, suitably about 3.6 to about 4, or about 3.6.

As described herein, suitably the nanoparticles that are supported by the various supports of the present invention, including carbon black, carbon powder (including cross-linked carbon powder), nanowires, and nanowire-powder composites, have a size of about 1 nm to about 10 nm, or about 1 nm to about 5 nm, suitably about 1 nm to about 3 nm. In exemplary embodiments, the nanoparticles comprise one or more of Pt, Au, Pd, Ru, Re, Rh, Os, Ir, Fe, Co, Ni, Cu, Ag, V, Cr, Mo, W and alloys or mixtures thereof. In exemplary embodiments, the nanoparticles that are supported by the various supports comprise Pt:Ru, including Pt:Ru nanoparticles where the ratio of oxygen to Ru in the nanoparticles is in the range of about 3.6 to about 6, suitably about 3.6 to about 5, about 3.6 to about 4 or about 3.6, as described throughout.

In addition, the percentage of metallic ruthenium in the nanoparticles (suitably Pt:Ru nanoparticles) is less than about 30%, suitably less than about 20%, less than about 10% or less than about 5%. In embodiments where Pt:Ru electrochemical catalyst nanoparticles are supported on the supports, the percentage of metallic platinum is about 70% to about 95%. The maximum peak of the Pt:Ru nanoparticles of the present invention in a range of 2θ=30° to 44° is located in a range of not less than 33.0° to less than 37.0°. Suitably, the Pt:Ru nanoparticles of the present invention have a crystal size of not more than 3 nm.

In exemplary embodiments, the nanowires of the nanowire-supported and carbon powder-nanowire composite-supported electrochemical catalysts comprise $RuO_2$, SiC, GaN, $TiO_2$, $SnO_2$, WCx, $MoC_x$, ZrC, $WN_x$, or $MoN_x$ nanowires, wherein x is a positive integer. Suitably, the nanowires are carbon-comprising nanowires, such as carbon nanotubes, carbon nanofibers and SiC nanowires, including interconnected nanowire networks such as those disclosed in U.S. Patent Application Publication No. 2007-0212538 and U.S. Patent Application Publication No. 2008-0280169.

In embodiments, the present invention provides nanowire-supported electrochemical catalysts comprising a Pt:Ru nanoparticle, wherein the atomic ratio of oxygen to Ru in the nanoparticle is about 3 to about 6, the percentage of metallic ruthenium is less than about 30%, and the percentage of metallic platinum is about 70% to about 90%. In further embodiments, the nanowire-supported electrochemical catalysts comprise nanoparticles in which the atomic ratio of oxygen to Ru in the nanoparticle is about 3.6 to about 4, the percentage of metallic ruthenium is less than about 10%, and the percentage of metallic platinum is about 70% to about 90%. The maximum peak of the Pt:Ru nanoparticles of the present invention in a range of 2θ=30° to 44° is located in a range of not less than 33.0° to less than 37.0°. Suitably, the Pt:Ru nanoparticles of the present invention have a crystal size of not more than 3 nm.

The present invention also provides catalyst supports comprising carbon black and cross-linked carbon powder, wherein the powder has at least one metal catalyst deposited thereon. As described throughout, these catalyst supports can be utilized in a membrane electrode assembly of a fuel cell. The catalyst supports can comprise catalyst materials, including nanoparticles, comprising of Pt, Au, Pd, Ru, Re, Rh, Os, Ir, Fe, Co, Ni, Cu, Ag, V, Cr, Mo, W and alloys or mixtures thereof. Suitably the catalysts are Pt:Ru electrochemical catalyst nanoparticles as described throughout, including those where the atomic ratio of oxygen to Ru in the nanoparticle is in the range of about 3.6 to about 6. Exemplary sizes and additional characteristics of the Pt:Ru electrochemical catalyst nanoparticles are described throughout.

Cross-linked carbon powder supports of the present invention are suitably cross-linked via graphene sheets (and/or nanographitic plates) extending from the carbon powder. The interaction between graphene sheets and carbon powder to form such cross-links is described throughout published U.S. Patent Application No. 2007/0212538. The graphene layers grow out of the plane of the carbon powder, attached via the a-b edges of the graphenes to the carbon powder and to each other. In embodiments, graphene layers can be interconnected as in the structure of graphite. Suitably, nanographitic plates will comprise less than about 100 graphene sheets, and more suitably, between about 2-15 graphenes. While the dimension of nanographitic plates in the a-b plane (i.e., the plane of the graphene layers) can be any size, generally they will be on the order of 10's to 100's of nanometers. Suitably the nanographitic plates will be less than about 100 nm across in the a-b plane. Graphenes and/or nanographitic plates generally extend away from the carbon powder a distance of between about 1 nm and about 500 nm, suitably on the order of a few nanometers to 10's of nanometers or even to a few 100 nanometers, and link other particles of carbon powder.

Suitably, the cross-linked carbon powder catalyst supports further comprise a proton conducting polymer, e.g., an ionomer such as Nafion, in contact with the powder. Such catalysts supports can be incorporated in fuel cells, such as DMFCs. Large pores present between the carbon powders can be reduced by the cross-linking graphene layers which block the pores, thereby reducing the amount of precious metal (e.g., Pt and/or Ru) required to prepare the catalysts. In addition, the cross-linked carbon powders provide an improved interface between catalysts layers and the polymer electrolyte membrane of the fuel cell, thereby reducing delamination of the catalyst layers. Ball-milling, grinding, or other mechanical methods can be utilized to control the size of the carbon powder supports by machining the supports after graphitization and cross-linking of the carbon powders.

In further embodiments, the present invention provides catalyst supports (e.g., nanostructured catalyst supports) comprising a composite of a network of inorganic nanowires and carbon powder, wherein the nanowires and/or the powder have at least one metal catalyst deposited thereon. Exemplary nanowires, such as the bird nest structures described herein (e.g, SiC nanowires with graphene sheets), can be utilized in the catalysts supports. Suitable catalysts, such as catalyst nanoparticles comprising Pt:Ru, as described herein, can be utilized. In exemplary embodiments, the carbon powder can be cross-linked via graphene sheets, or can be linked to the nanowires via graphene sheets, as described herein.

The catalyst supports comprising composites of a network of inorganic nanowires and carbon powder (carbon powder-nanowire composites, or nanowire-powder composites) of the present invention demonstrate improved performance in fuel cells, including DMFCs. While not wishing to be bound by any theory, it is believed that the improved performance is based on carbon powder being trapped in the spaces between the nanowire structures, thus reducing or eliminating $CO_2$ and/or water trapping. In addition, the carbon powders improve the interface between the catalyst layers and the polymer electrolyte membrane of a fuel cell, thereby reducing delamination.

The catalyst supports, including nanowire structures, interconnected nanowire networks, carbon powder, carbon black, and carbon powder-nanowire composites, comprising electrochemical catalysts of the present invention (also called "supported electrochemical catalysts" throughout) can be used in various fuel cell applications and configurations. The supported electrochemical catalysts can be used as fuel cell cathodes, for example, a cathode comprising a nanowire, carbon black, carbon powder, interconnected nanowire network, or carbon powder-nanowire composite, and Pt:Ru nanoparticles with a diameter from about 1 nm to about 10 nm, about 1 to 3 nm, or about 3 nm to about 5 nm. The supported electrochemical catalysts can also be used as fuel cell anodes, for example, by using catalytic Pt:Ru nanoparticles on the order of about 1 nm to about 10 nm, or more suitably, from about 1 nm to about 5 nm in diameter. FIG. 1 illustrates nanoparticles of about 1.67 nm. In exemplary anode catalysts, the Pt:Ru nanoparticles will have an atomic ratio of Pt:Ru of about 0.1 to about 20, or more suitably about 0.5 to about 3.

The present invention also provides membrane electrode assemblies comprising the nanowire, carbon black, carbon powder, interconnected nanowire network, or carbon powder-nanowire composite, supported electrochemical catalyst nanoparticles of the present invention. As described throughout, suitably the electrochemical catalyst nanoparticles comprise one or more metals, wherein the atomic ratio of oxygen in the nanoparticle to one or more of the metals in the nanoparticle is about 3 to about 6 (about 3.6 to about 5, about 3.6 to about 4, or about 3.6). Exemplary nanoparticles include Pt:Ru nanoparticles, wherein the ratio of oxygen to Ru is in the range of about 3.6 to about 6, and wherein the percentage of metallic ruthenium is less than about 30%, and the percentage of metallic platinum is about 70% to about 90%. The maximum peak of the Pt:Ru nanoparticles of the present invention in a range of $2\theta=30°$ to $44°$ is located in a range of not less than $33.0°$ to less than $37.0°$. Suitably, the Pt:Ru nanoparticles of the present invention have a crystal size of not more than 3 nm. The membrane electrode assemblies of the present invention can be utilized as a component in a fuel cell, including methanol fuel cells, formic acid fuel cells, ethanol fuel cells, hydrogen fuel cells or ethylene glycol fuel cells.

The membrane electrode assemblies (MEA) of the present invention suitably comprise the electrochemical catalyst nanoparticles disclosed herein as components of cathode catalysts and/or anode catalysts, and also a membrane (e.g., a NAFION® membrane, DuPont, Wilmington, Del.). Such MEAs can be constructed using well known methods in the art, for example as set forth in U.S. Pat. Nos. 6,933,033; 6,926,985; and 6,875,537, the disclosures of each of which are incorporated herein by reference in their entireties. In exemplary embodiments, the membrane will be disposed on one side with a cathode catalyst and on the other side an anode catalyst. Fuel cells comprising such MEAs, as well as gas diffusion layers (e.g., carbon fiber cloth), bipolar plates and end plates (e.g., machined graphite or molded conducting polymer composites) can also be constructed, as is well known in the art. Exemplary fuel cells that can be constructed using the nanowire, carbon black, carbon powder, interconnected nanowire network, or carbon powder-nanowire composite, supported electrochemical catalyst nanoparticles disclosed herein include proton exchange membrane fuel cells (PEMFC) and direct methanol fuel cells (DMFC). The supported electrochemical catalyst nanoparticles can also be used to generate anodes and cathodes, for example for use in lithium batteries and electrochemical capacitors. The components and construction of such batteries and capacitors is well known in the art.

In one embodiment of the invention, the nanowire portion of the anode (and/or cathode) electrode of the invention may be synthesized on a growth substrate, and then transferred and incorporated into the membrane electrode assembly structure of the fuel cell, such as described in U.S. Patent Application Publication No. 2007-0212538 and U.S. Patent Application Publication No. 2008-0280169.

Following growth of the nanowires, the nanowires are suitably harvested from their synthesis location. The free standing nanowires can then be introduced into or deposited upon the relevant surface of the fuel cell component such as the gas diffusion layer(s) or proton exchange membrane, for example, by spray/brush painting, solution coating, casting, electrolytic deposition, filtering a fluid suspension of the nanowires, and combinations thereof. Suitably, electrochemical catalyst nanoparticles of the present invention are then introduced. Deposition may simply involve immersing the component of interest (e.g., one or more of the gas diffusion layers or the proton exchange membrane) into a suspension of such nanowires, or may additionally involve pretreating all or portions of the component to functionalize the surface or surface portions for wire attachment. As described in U.S. Patent Application Publication No. 2007-0212538 and U.S. Patent Application Publication No. 2008-0280169, the nanowires may also be introduced into a solution (e.g., methanol, ethylene glycol or water), filtered (e.g., vacuum filtered over a polyvinylidene fluoride (PVDF) membrane) to give them a dense, intertwined mat or "bird's nest structure," removed from the filter after drying and washing, and then heat treated (e.g., annealed) at high temperatures. The resulting porous sheet of nanowires (whether interconnected with nanographitic plates or not) can then be incorporated into the membrane electrode assembly of the fuel cell. A variety of other deposition methods, e.g., as described in U.S. Patent Application Publication No. 20050066883, published Mar. 31, 2005, and U.S. Pat. No. 6,962,823, the full disclosures of which are incorporated herein by reference in their entirety for all purposes, can also be used. The nanowires may also be grown directly on one or more of the fuel cell components such as one or more of the bipolar plates, gas diffusion layer, and/or proton exchange membrane.

Typically, a fuel cell generally comprises an anode electrode, a cathode electrode, and a proton exchange membrane (PEM). The assembly of these three components is generally referred to as a membrane electrode assembly (MEA). As described in U.S. Patent Application Publication No. 2007-0212538 and U.S. patent application Ser. No. 11/808,76, nanowires can be used to replace traditional carbon particles in PEMFCs as the catalyst support and electron conducting medium to make MEAs. Because the generation of surface functional groups on nanostructured catalyst supports and nanowires, e.g., nanowires such as SiC or GaN, is relatively straightforward, catalyst nanoparticles such as Pt and/or Pt:Ru nanoparticles of the present invention (as well as a proton conducting polymer (e.g., NAFION®)), can be facileiy deposited on the nanostructured catalyst supports and nanowires, e.g., without agglomeration of the particles. Each catalyst particle is then directly connected to the anode (and cathode) through the nanowire shell. The multiple electrical connectivity of the interconnected nanowires secures the electronic route from Pt to the electron conducting layer.

An exemplary fuel cell comprising nanowire, carbon black, carbon powder, interconnected nanowire network, or carbon powder-nanowire composite, supported electrochemical catalyst nanoparticles of the present invention suitably includes an anode bipolar electrode plate, a cathode bipolar electrode plate, a proton exchange membrane, an anode electrode, an anode gas diffusion layer, a cathode electrode, a cathode gas diffusion layer, and nanowire, carbon black, carbon powder, interconnected nanowire network, or carbon powder-nanowire composite, catalyst supports positioned between both the anode electrode and cathode electrode on one side, and the proton exchange membrane on the other side of the fuel cell. Generally, a plurality of fuel cells or MEAs can be combined to form a fuel cell stack. The cells within the stacks are connected in series by virtue of the bipolar plates, such that the voltages of the individual fuel cells are additive.

Suitably, the nanowire, carbon black, carbon powder, interconnected nanowire network, or carbon powder-nanowire composite, catalyst supports and electrochemical catalyst nanoparticles disclosed herein are dispersed in a polymer electrolyte material that disperses on the surface of nanowires, carbon black and/or carbon powder to provide sufficient contact points for proton (e.g., $H^+$) transport. Polymer electrolytes can be made from a variety of polymers including, for example, polyethylene oxide, poly(ethylene succinate), poly (β-propiolactone), and sulfonated fluoropolymers such as NAFION® (commercially available from DuPont Chemicals, Wilmington). A suitable cation exchange membrane is described in U.S. Pat. No. 5,399,184, for example, the disclosure of which is incorporated herein by reference. Alternatively, the proton conductive membrane can be an expanded membrane with a porous microstructure where an ion exchange material impregnates the membrane effectively filling the interior volume of the membrane. U.S. Pat. No. 5,635, 041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, the disclosure of which is incorporated herein by reference. In additional embodiments, proton shuttle molecules can be attached to the nanowires. For example, short hydrocarbon chains comprising —$SO_3H$ groups (e.g., 2-6 carbons long) can be grafted to the nanowires, as described in U.S. Patent Application Publication No. 2007-0212538 and U.S. Patent Application Publication No. 2008-0280169. Use of such proton shuttle molecules can reduce the amount of NAFION® or other ionomer required, thereby increasing the available surface area of the catalytic nanoparticles.

The nanowires which form the interconnected nanowire networks may optionally be fused or cross-linked at the points where the various wires contact each other, to create a more stable, robust and potentially rigid membrane electrode assembly. The nanowires may also include surface chemical groups that may form chemical cross-links in order to cross-link the underlying nanowires. For example, the nanowires may be cross-linked or fused together by depositing a small amount of conducting or semiconducting material at their cross-points. For example, SiC nanowires (or, e.g., carbon nanotube nanowires having a SiC shell layer) can be cross-linked by depositing amorphous or polycrystalline SiC at their cross-points.

The nanowire networks disclosed in U.S. Patent Application Publication No. 2007-0212538 and U.S. Patent Application Publication No. 2008-0280169 are suitably employed as the support for the electrochemical catalyst nanoparticles (e.g., platinum, ruthenium, Pt:Ru) which may be coated or deposited, for example, on the nanowires. See e.g., FIG. 1, showing transmission electron micrograph images of 1.67 nm Pt:Ru (1:1) nanoparticles deposited on the surface of nanographite coated nanowires at two different magnifications. Appropriate catalysts for fuel cells generally depend on the reactants selected. For example, the electrochemical catalyst nanoparticles (also called catalyst metals throughout) may be selected from the group comprising, but not limited to, one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). Suitable catalyst materials for oxidation of hydrogen or methanol fuels specifically include metals such as, for example, Pd, Pt, Ru, Rh and Pt:Ru.

As described herein, suitably the electrochemical catalyst nanoparticles that are supported by the nanowire, carbon black, carbon powder, interconnected nanowire network, or nanowire-carbon powder composite, comprise oxygen at an atomic ratio to one or more of the metals of the nanoparticles of about 3.6 to about 5, and are about 1 to about 10 nm in size. Suitably, the electrochemical catalyst nanoparticles comprise Pt:Ru, wherein the percentage of metallic ruthenium is less than about 30%, and the percentage of metallic platinum is about 70% to about 90%. The maximum peak of the Pt:Ru nanoparticles of the present invention in a range of 2θ=30° to 44° is located in a range of not less than 33.0° to less than 37.0°. Suitably, the Pt:Ru nanoparticles of the present invention have a crystal size of not more than 3 nm.

The electrochemical catalyst nanoparticles may be deposited or otherwise associated with the nanowire, carbon black, carbon powder, interconnected nanowire network, or carbon powder-nanowire composite, catalyst support surface as a thin film (e.g., less than about 10 angstroms in thickness) (or a series of catalyst particles) using a variety of catalyst deposition techniques including, for example, chemical vapor deposition, electrochemical deposition (e.g., electroplating or electroless chemical plating), physical vapor deposition, solution impregnation and precipitation, colloid particle absorption and deposition, atomic layer deposition, and combinations thereof. The amount of the catalyst metal coated by the methods described herein is preferably in the range of about 0.5%-85% by weight, suitably about 10%-85%, about 20%-80%, more suitably about 20-60% by weight, for example about 30%-55% by weight, based on the total amount of catalyst metal and nanowire, carbon black, carbon powder, interconnected nanowire network, or nanowire-carbon powder composite, material.

Alternatively, in one embodiment, the electrochemical catalyst nanoparticles can be deposited on the nanowire, carbon black, carbon powder, interconnected nanowire network, or carbon powder-nanowire composite, catalyst support surface as a plurality of nanometer-sized metallic catalyst particles (e.g., between about 1 and 50 nm in diameter, e.g., less than about 10 nm in diameter, e.g., between about 1 and 5 nm or about 1 and 3 nm in diameter), in solution. By derivatizing the nanowire, carbon black, carbon powder, interconnected nanowire network, or carbon powder-nanowire composite, catalyst support external surface with one or more functional linker moieties (e.g., a chemically reactive group) such as one or more carboxylic acid groups, nitric acid groups, hydroxyl groups, amine groups, sulfonic acid groups, and the like, the nanoparticles are able to more easily bind to the surface of the supports. The electrochemical catalyst nanoparticles (or film) can be attached to the supports either uniformly or non-uniformly. The electrochemical catalyst nanoparticles can be spherical, semi-spherical or non-spherical. The electrochemical catalyst nanoparticles can form islands on the surface of the supports or can form a continuous coating on the surface of the supports such as in a core-shell arrangement, for example as stripes or rings along the length of the nanowire, etc. The electrochemical catalyst nanoparticles can be attached to the nanowire, carbon black, carbon powder, interconnected nanowire network, or carbon powder-nanowire composite, catalyst support surface before or after the support is incorporated/deposited into the MEA of the fuel cell. In one embodiment, the electrochemical catalyst nanoparticles can be selected from a population of catalyst particles having a uniform size distribution of less than about 50%, for example, less than about 30%, for example, less than about 20%.

When a chemical linker molecule is used to bind the electrochemical catalyst nanoparticles to the nanowire, carbon black, carbon powder, interconnected nanowire network, or carbon powder-nanowire composite, the chemical linker can be selected to promote electrical connection between the electrochemical catalyst nanoparticles and the support, or the chemical linker can be subsequently removed to promote electrical connection. For example, heat, vacuum, chemical agents or a combination thereof, can optionally be applied to the supports to cause the linker molecule to be removed to place the catalysts in direct physical contact with the supports to form a solid electrical connection between the catalyst particles and the support. The structure can also be heated to anneal the interface between the catalysts and the supports in order to improve the electrical contact therebetween. Appropriate temperatures and heating conditions are well known to those of skill in the art.

Nanowire-supported electrochemical catalyst nanoparticles of the present invention can be prepared using the various methods disclosed in U.S. Patent Application Publication No. 2007-0212538 and U.S. Patent Application Publication No. 2008-0280169. Suitably, one or more nanowires are dispersed in a solution. One or more catalyst metals are then added to the solution, and the solution is refluxed, whereby the catalyst metals become associated with the nanowires. Any suitable solution can be used for dispersion of the nanowires and then subsequent refluxing. Exemplary solutions include organic solvents such as ethylene glycol, as well as alcohols and aqueous-based solutions.

As discussed throughout, in exemplary embodiments, the nanowires are derivatized with at least a first functional group which binds the catalyst metal, for example, a nitric acid, a carboxylic acid group, a hydroxyl group, an amine group, and a sulfonic acid group.

Following refluxing the nanowire solution, the nanowire-supported electrochemical nanoparticles (also referred to as catalyst metal-associated nanowires throughout) are filtered to generate a solid nanowire dispersion with associated catalyst metals, and then dried.

Following catalyst deposition, a proton conducting polymer such as NAFION® may optionally be deposited on the nanowire, carbon black, carbon powder, interconnected nanowire network, or carbon powder-nanowire composite, surface between catalyst particle sites, for example, by functionalizing the surface of the support with a second functional group (different from the catalyst functional group, when used) that preferentially binds the electrolyte or which promotes consistent and/or controlled wetting. The polymer can either be a continuous or discontinuous film on the surface of the nanowire. For example, the polymer electrolyte can be uniformly wetted on the surface of the wires, or can form point-contacts along the length of the wire. The nanowire, carbon black, carbon powder, interconnected nanowire network, or carbon powder-nanowire composite, may be functionalized with a sulfonated hydrocarbon molecule, a fluorocarbon molecule, a short chain polymer of both types of molecules, or a branched hydrocarbon chain which may be attached to the support surface via silane chemistry. Those of skill in the art will be familiar with numerous functionalizations and functionalization techniques which are optionally used herein (e.g., similar to those used in construction of separation columns, bio-assays, etc.). Alternatively, instead of binding ionomer to the supports through a chemical binding moiety, the supports may be directly functionalized to make them proton conductive. For example, the supports may be functionalized with a surface coating such as a perfluorinated sulfonated hydrocarbon using well-known functionalization chemistries.

For example, details regarding relevant moiety and other chemistries, as well as methods for construction/use of such, can be found, e.g., in Hermanson Bioconjugate Techniques Academic Press (1996), Kirk-Othmer Concise Encyclopedia of Chemical Technology (1999) Fourth Edition by Grayson et al. (ed.) John Wiley & Sons, Inc., New York and in Kirk-Othmer Encyclopedia of Chemical Technology Fourth Edition (1998 and 2000) by Grayson et al. (ed.) Wiley Interscience (print edition)/ John Wiley & Sons, Inc. (e-format). Further relevant information can be found in CRC Handbook of Chemistry and Physics (2003) 83rd edition by CRC Press. Details on conductive and other coatings, which can also be incorporated onto the nanowire surface by plasma methods and the like can be found in H. S, Nalwa (ed.), Handbook of Organic Conductive Molecules and Polymers, John Wiley & Sons 1997. See also, "ORGANIC SPECIES THAT FACILITATE CHARGE TRANSFER TO/FROM NANOCRYSTALS," U.S. Pat. No. 6,949,206. Details regarding organic chemistry, relevant for, e.g., coupling of additional moieties to a functionalized surface can be found, e.g., in Greene (1981) Protective Groups in Organic Synthesis, John Wiley and Sons, New York, as well as in Schmidt (1996) Organic Chemistry Mosby, St Louis, Mo., and March's Advanced Organic Chemistry Reactions, Mechanisms and Structure, Fifth Edition (2000) Smith and March, Wiley Interscience New York ISBN 0-471-58589-0, and U.S. Patent Publication No. 20050181195, published Aug. 18, 2005. Those of skill in the art will be familiar with many other related references and techniques amenable for functionalization of surfaces herein.

By increasing the density of sulfonic groups on the ionomer utilized in the MEAs and varying the ionomer side chains, the characteristics, including surface groups and equivalent weight of the ionomer (e.g., Nafion) can be matched to the supported electrochemical catalysts. This allows for an increase in the ratio of catalyst in contact with the electrolyte ionomer. For example, a Nafion ionomer having an equivalent weight (EW) of 1000, or a shorter side chain ionomer (e.g., Hyflon) with a lower EW (e.g., 850), can be utilized with the supported electrochemical catalysts in direct methanol fuel cells. With the nanowires, supported electrochemical catalysts align on the nanowire supports, thereby exposing the catalysts to large pores in the nanowire structure, thus allowing for the tailored ionomers to efficiently contact the catalysts increasing the ratio of catalysts in contact with ionomer. As used herein "tailored ionomer" refers to an ionomer that is matched to the characteristics of the nanowire, carbon black, carbon powder, interconnected nanowire network, or carbon powder-nanowire composite, support of the present invention such that a greater amount of ionomer is able to reach the catalysts than if the ionomer is not appropriately matched. Suitably, the ionomer has an equivalent weight of 1000 or 850.

The polymer electrolyte coating may be directly linked to the surface of the nanowire, carbon black, carbon powder, interconnected nanowire network, or carbon powder-nanowire composite, e.g., through silane groups, or may be coupled via linker binding groups or other appropriate chemical reactive groups to participate in linkage chemistries (derivitization) with linking agents such as, e.g., substituted silanes, diacetylenes, acrylates, acrylamides, vinyl, styryls, silicon oxide, boron oxide, phosphorus oxide, N-(3-aminopropyl)-3-mercapto-benzamide, 3-aminopropyl-trimethoxysilane, 3-mercaptopropyl-trimethoxysilane, 3-maleimidopropyl-trimethoxysilane, 3-hydrazidopropyl-trimethoxysilane, trichloro-perfluoro octyl silane, hydroxysuccinimides, maleimides, haloacetyls, hydrazines, ethyldiethylamino propyl-carbodiimide, and/or the like. Other surface functional chemistries can be used such as those that would be known to one or ordinary skill in the art.

In addition, a solubilized perfluorosulfonate ionomer (e.g., NAFION®) may be placed into the space between nanowires, carbon powder, or in the composites. The structure (e.g., as a porous sheet of interconnected nanowires, carbon powder, or nanowires and carbon powder), when not produced in situ on one of the bipolar plates and/or proton exchange membrane, may then be placed between gas diffusion layers respectively disposed on bipolar plates, wherein the bipolar plates are disposed on either side of a proton exchange membrane. The assembly is hot pressed to form a complete membrane-electrode assembly fuel cell according to the present invention. The pressing temperature is determined such that the proton exchange membrane is softened in that temperature range, for example, to 125 ° Celsius for NAFION®. The pressure level is about 200 kgf/cm$^2$.

In order to efficiently distribute fuel/oxygen to the surface of the anode/cathode electrodes a gas diffusion layer is typically needed in conventional fuel cells between the anode electrode and bipolar plate on one side, and the cathode electrode and bipolar plate on the other side of the fuel cell. Typically, a carbon fiber cloth is used as the gas diffusion layer. With the interconnecting nanowire composite membrane electrode catalyst support assembly of the present invention, this gas diffusion layer can be eliminated due to the superior structure of the nanowire-based electrodes.

Figure 3:
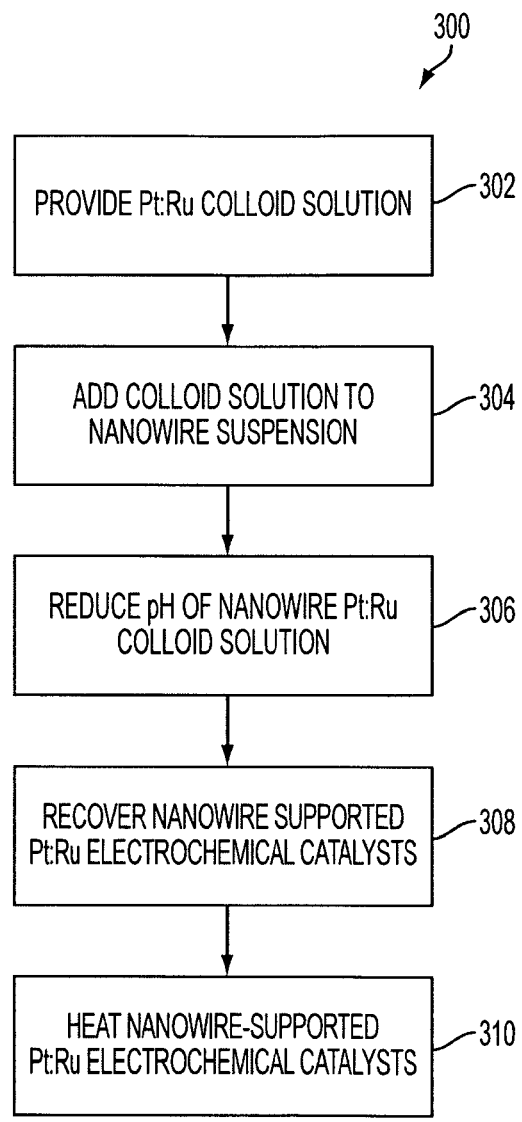
FIG. 3 shows a method of forming nanowire-supported electrochemical catalysts in accordance with one embodiment of the present invention.

In further embodiments, as shown in flowchart 300 of FIG. 3, the present invention provides methods of preparing a nanowire-supported Pt:Ru electrochemical catalyst nanoparticles. As described herein, suitably, the atomic ratio of oxygen to Ru in the nanoparticles is in the range of about 3 to about 6, the percentage of metallic ruthenium is less than about 30%, and the percentage of metallic platinum is about 70% to about 95%.

In exemplary embodiments, as shown in flowchart 300, a Pt:Ru colloid solution is provided in 302. In suitable embodiments, the Pt:Ru colloid solution is prepared by combining $RuCl_3$ $xH_2O$, ethylene glycol, $H_2PtCl_6$ $xH_2O$ and NaOH. Suitably, the amount of $RuCl_3xH_2O$ is about 100 mg to about 500 mg, or about 200 mg to about 300 mg, or about 250 mg. The amount of $H_2PtCl_6xH_2O$ that is used is suitably about 300 mg to about 700 mg, or about 400 mg to about 600 mg, or about 500 mg. Suitably, 0.5 M NaOH is used at an amount of about 20 mL to about 80 mL, or about 30 mL to about 60 mL, or about 50 mL. It should be understood that the amounts and concentrations of these agents is provided only for illustrative purposes and the ordinarily skilled artisan will readily understand that the amounts and concentrations can be varied accordingly to produce larger or smaller size samples, and also, can be modified without ultimately changing the final resulting product. Appropriate mixing methods and materials are well known in the art.

In 304 of flowchart 300, the Pt:Ru colloid solution is then added to a suspension of nanowires to prepare a nanowire-Pt:Ru colloid solution. In exemplary embodiments, the nanowires are carbon comprising nanowires, such as those described herein and in U.S. Patent Application Publication No. 2007-0212538 and U.S. Patent Application Publication No. 2008-0280169. Suitably, the nanowires are suspended in ethylene glycol, though other aqueous (or non-aqueous) solutions can also be used, e.g., water, ethanol, etc. The amounts of the colloid solution and the nanowire suspension can be readily adjusted by those of ordinary skill in the art to produce larger or smaller samples, and also, to produce higher or lower concentrations of catalysts on the nanowires.

In 306 of flowchart 300 of FIG. 3, the pH of the nanowire-Pt:Ru colloid solution is then reduced. Suitably, the pH is reduced from its initial level to about 12-10, suitably about 11, then to about 6-9, suitably about 7, then to about 3-5, suitably about 4, and then finally, to about 1-2, suitably about 1. In embodiments, this pH reduction is performed over the course of about 16-30 hours, for example, about 18-30 hours, or about 24 hours. It should be understood that additional pH levels between these values can also be used. In suitable embodiments, the pH is reduced to about 11, then dropped to about 7 and maintained at pH 7 for about 18 hours. The pH is then dropped to about 4, and maintained at pH 4 for about 4 hours. Finally, the pH is dropped to about pH 1 and maintained there for about 1 hour prior to recovery of the nanowires. Any suitable acid can be used to reduce the pH of the solution, including nitric acid, HCl, etc.

In 308 of flowchart 300, the nanowire-supported Pt:Ru electrochemical catalysts are then recovered from the solution. In exemplary embodiments, this recovery comprises filtering the solution and then washing the nanowires (e.g., in deionized water) to remove contaminants and other debris.

In suitable embodiments, the methods further comprise step 310 of flowchart 300 of heating the nanowire-supported Pt:Ru electrochemical catalysts after the recovery (e.g., after the filtering and washing). For example, the nanowire-supported Pt:Ru catalysts are heated to a temperature of about 150-300° C., for example, about 150-200° C. or about 180° C., for about 3-10 hours, suitably about 5 hours.

A similar method can be utilized to prepare carbon black, carbon powder (including cross-linked carbon powder), or nanowire-carbon powder composites, comprising the electrochemical nanoparticle catalysts of the present invention.

Membrane Electrode Assemblies and Fuel Cells Comprising Electrochemical Catalyst Nanoparticles As described throughout, present invention also provides membrane electrode assemblies (MEAs) comprising the electrochemical catalyst nanoparticles of the present invention, as well as fuel cells comprising the nanoparticles and MEAs. Exemplary methods of preparing MEAs are disclosed in U.S. Patent Application Publication No. 2007-0212538 and U.S. Patent Application Publication No. 2008-0280169. In suitable embodiments, an optional gas diffusion layer is provided, such as a, TEFLON® (DuPont) treated surface, for example TEFLON® treated carbon paper or woven cloth (e.g., carbon cloth). Supported electrochemical catalysts are then disposed adjacent the optional gas diffusion layer. Disposing components adjacent one another, includes, layering, applying, spraying, coating, spreading, or any other form of application of the various components.

A membrane layer is then disposed adjacent the supported electrochemical catalyst composition. Suitably, membrane layer comprises a proton conducting polymer, such as NAFION® or other sulfonated polymer. A second composition of supported electrochemical catalysts is then disposed adjacent the membrane layer. In exemplary embodiments, the proton-conducting polymer can comprise an interfacial layer, as disclosed in U.S. Provisional Patent Application No. 61/108,301, filed Oct. 24, 2008, entitled "Membrane Electrode Assemblies with Interfacial Layer,".

In suitable embodiments, nanowire-supported electrochemical catalysts comprise nanowire ink solutions, suitably comprising one or more additional components such as surfactants or polymers (for example, to aid in nanowire dispersion) and/or ionomers, such as NAFION®. Suitably, the concentration of nanowires in the various nanowires solutions are from about 0.01% to about 50% by volume, for example, about 0.1% to about 20% by volume. Suitably, the first and second compositions of catalyst metal-associated nanowires are nanowire solutions which also further comprise one or more ionomers, such as NAFION®.

Exemplary nanowire-supported electrochemical catalyst nanoparticles for use in preparing the MEAs and fuel cells of the present invention include those described throughout. In additional embodiments, the carbon black, carbon powder, or carbon powder-nanowire composite, supports of the present invention can be utilized to prepare MEAs and fuel cells. Nanoparticles wherein the atomic ratio of oxygen in the nanoparticles to metal in the nanoparticles is in the range of about 3.6 to about 5, as described herein, are suitably used in the MEAs and fuel cells. Suitably, the supported electrochemical catalyst nanoparticles are used to prepare anodes and cathodes of the MEAs and fuel cells.

Additional methods of forming MEAs and fuel cells comprising the electrochemical catalyst nanoparticles, and suitably the nanowire, carbon black, carbon powder, interconnected nanowire network, or carbon powder-nanowire composite, supported electrochemical catalyst nanoparticles, are found throughout U.S. Patent Application Publication No. 2007-0212538 and U.S. Patent Application Publication No. 2008-0280169. Methods for disposing the various layers of MEAs include layering, brushing, etc., and in suitable embodiments, spraying the various layers. Spraying a solution of nanowire, carbon black, carbon powder, interconnected nanowire network, or carbon powder-nanowire composite, supported electrochemical catalyst nanoparticles (e.g., nanowires in an aqueous or alcohol-based solution) allows for the control of the thickness and density of the layer. In addition, one or more ionomers can be provided in the solution to be sprayed, thereby allowing for spraying of a solution of supported electrochemical catalyst nanoparticles and one or more ionomers. Exemplary ionomers are described throughout and include sulphonated polymers (e.g., NAFION®) and the like.

Membrane electrode assemblies prepared by the methods of the present invention can be utilized in preparation of various fuel cell electrodes, for example, in fuel cell electrode stacks. Exemplary fuel cells include oxidative fuel cells, such as methanol fuel cells, formic acid fuel cells, ethanol fuel cells, hydrogen fuel cells, ethylene glycol fuel cells and other fuel cells known to those of ordinary skill in the art.

For example, the present invention also provides fuel cell membrane electrode assemblies. For example, as disclosed in U.S. Patent Application Publication No. 2007-0212538 and U.S. Patent Application Publication No. 2008-0280169, suitable MEAs can comprise an optional gas diffusion layer comprising one or more nanowires. The MEAs also further comprise a first composition of supported electrochemical catalyst nanoparticles of the present invention and ionomer adjacent the gas diffusion layer. Exemplary MEAs also comprise a proton-conducting membrane layer (suitably comprising a interfacial layer) adjacent the first supported electrochemical catalyst nanoparticles, and a second composition of supported electrochemical catalyst nanoparticles and ionomer adjacent the proton-conducting membrane layer. In further embodiments, the MEAs can further comprise an optional additional gas diffusion layer adjacent the second composition of supported catalyst.

As described throughout, exemplary nanowires for use in the MEAs are nanowires wherein each nanowire in the network of nanowires is contacted by at least one other nanowire in the nanowire network and is electrically connected to one or more other nanowires in the nanowire network. For example, at least one of the nanowires in the network has a branched structure. Exemplary nanowires for use in the practice of the present invention are selected from the group comprising $RuO_2$, SiC, GaN, $TiO_2$, $SnO_2$, $WC_x$, $MoC_x$, ZrC, $WN_x$, and $MoN_x$ nanowires (as noted herein, x represents a positive integer (e.g., a whole integer)). Suitably, the MEAs are components in oxidative fuel cells, such as methanol fuel cells, formic acid fuel cells, ethanol fuel cells, hydrogen fuel cells or ethylene glycol fuel cells.

Any number of MEA layers up to an $n^{th}$, or final desired MEA layer, can be prepared in the fuel cell electrode stacks of the present invention. Suitably, the ends of a fuel cell electrode stack comprise end plates and bipolar plates. Typically, bipolar plates and end plates are highly electrically conductive and can be made from graphite, metals, conductive polymers, and alloys and composites thereof. Materials such as stainless steel, aluminum alloys, carbon and composites, with or without coatings, are good viable options for bipolar end plates in fuel cells. Bipolar plates and end plates can also be formed from composite materials comprising highly-conductive or semiconducting nanowires incorporated in the composite structure (e.g., metal, conductive polymer etc.). While bipolar plates suitably comprise channels and/or groves on both surfaces, end plates typically only comprise channels and/or groves on the surface that is contact with the fuel cell components (i.e., the internal surface), while the external surface does not comprise such channels or groves. Suitably, the various fuel cell components are repeatedly disposed/layered/stacked until the final, desired fuel cell stack is achieved.

The final fuel cell stack can then be clamped together, and fuel impregnated with a suitable electrolyte, for example, an ethylene glycol solution, methanol, formic acid, formaldehyde or small alcohols. Addition of further components as disclosed throughout and known in the art can then be added to yield a working fuel cell.

As the electrochemical catalyst nanoparticles and nanowire, carbon black, carbon powder, interconnected nanowire network, or carbon powder-nanowire composite, supported electrochemical catalyst nanoparticles of the present invention provide for increased catalytic activity relative to other catalysts without the disclosed characteristics, the amount of catalyst particles that are required for a particular application can be reduced, thereby allowing for a reduced material cost and thus reduced cost for fuel cell production. In addition, utilizing less catalyst in the electrodes allows for the production of thinner electrodes, and thus reduced resistance of the electrodes.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Example 1

Preparation of Electrochemical Catalyst Nanoparticles and Nanowire-Supported Electrochemical Catalyst Nanoparticles Materials:
$RuCl_3 \cdot xH_2O$ (Aldrich), $H_2PtCl_6 \cdot xH_2O$ (Aldrich), Anhydrous ethylene glycol (Aldrich) and 0.5 M NaOH ethylene glycol solution.

Preparation:
250 mg $RuCl_3 \cdot xH_2O$ was added to a 300 mL three-neck flask. 30 mL of ethylene glycol was added and stirred with a magnetic stirring bar until a clear solution was formed (approximately a few hours). 500 mg of $H_2PtCl_6 \cdot xH_2O$ and an additional 20 mL of ethylene glycol were then added. 50 mL of 0.5 M NaOH solution was added, and the solution was purged with Ar gas. The solution was then heated in an oil bath at about 165° C. for about 3 hours to produce a Pt:Ru colloid solution.

100 mg of carburized nanowires suspended in 10 mL of ethylene glycol were dispersed via sonication. The dispersion was transferred to a 250 mL beaker.

15 mL of the Pt:Ru colloid solution was then added to the nanowires, and nitric acid of proper concentration was added drop-wise until the pH of the solution reached pH 11. Additional nitric oxide (10 mL of 0.0000065% nitric acid, 10 mL of 0.0002% nitric acid, 10 mL of 0.01% nitric acid and 0.2% nitric acid as required) was added drop-wise until the solution reached pH 7. The solution was then stirred for 18 hours. Additional nitric oxide (0.2% nitric acid) was then added drop-wise until the solution reached pH 4. The solution was stirred for an additional four hours, and then additional nitric acid (6% nitric acid) was added drop-wise until the solution reached pH 1. The solution was stirred for one additional hour, and then the solution was filtered. Use of the specified nitric acid concentrations allow for the rate of drop of the pH to be controlled.

The filtered nanowire-supported electrochemical catalyst nanoparticles were then washed three times in deionized water, suspended in deionized water, filtered, and then washed again. The nanowire-supported electrochemical catalyst nanoparticles were dried at 120° C. overnight under vacuum, and then heated at 180° C. in air for 5 hours.

Several lots of nanowire-supported Pt:Ru electrochemical catalyst nanoparticles were prepared using the above method and characterized by x-ray diffraction and x-ray photoelectron spectroscopy to determine the surface characteristics of the catalysts, specifically, the atomic ratio of oxygen to ruthenium. The nanowire-supported Pt:Ru electrochemical catalyst nanoparticles were then prepared into electrodes and the mass activity of the different lots were measured.

The results of these tests are shown in FIG. 2A, showing the mass activity (mA/mg) at 0.5V, versus the measured ratio of oxygen to Ru for the different lots. As can be seen in FIG. 2A, for nanoparticles in which the atomic ratio of oxygen to Ru is greater than about 3, for example, greater than about 3.6, there is a dramatic increase in the mass activity of the nanoparticles, ranging from about 2-5 times the activity of nanoparticles that have an atomic ratio of oxygen to Ru of less than about 3.

PtRu/NW and PtRu/C01 represent catalysts in which the catalyst nanoparticles of the present invention were supported. Nanowires (NW) were used as a support in PtRu/NR, and Ketjen Black EC® (hereinafter referred to as "KB") was used as a support in PtRu/C01. Otherwise, PtRu/NW and PtRu/C01 were prepared under the same conditions. PtRu/C02 is a catalyst manufactured by Tanaka Kikinzoku Kogyo K.K. (TEC66E50). In Table 1, PtRu/C03 through PtRuC06 represent different lots of PtRu/C01 prepared under the same conditions. Each of PtRu/C07 through C09 was different from PtRu/C01 only in the amount of catalyst nanoparticles supported therein (as for the manufacturing condition, the amount of colloid added was changed from PtRu/C01). Each of PtRu/C10 and PtRu/C11 was prepared by a colloid supporting method. These data demonstrated that a peak position of each of the catalysts of the present invention (PtRu/NR, PtRu/C01, and PtRu/C03 through PtRu/C09) is different from that of PtRu/C02, PtRu/C10, and PtRu/C11.

TABLE 1

| Catalysts | Supports | Metal weight (wt %) | Peak position (2θ) |
|---|---|---|---|
| PtRu/NW | NW | 29.8 | 35.38 |
| PtRu/C01 | KB | 30.5 | 35.16 |
| PtRu/C02 | KB | 52.1 | 40.68 |
| PtRu/C03 | KB | 30.7 | 35.34 |
| PtRu/C04 | KB | 30.6 | 33.96 |
| PtRu/C05 | KB | 31.8 | 34.88 |
| PtRu/C06 | KB | 33.9 | 35.10 |
| PtRu/C07 | KB | 45.7 | 34.16 |
| PtRu/C08 | KB | 53.1 | 33.78 |
| PtRu/C09 | KB | 53.4 | 36.08 |
| PtRu/C10 | KB | 54.9 | 39.04 |
| PtRu/C11 | KB | 54.0 | 38.72 |

The prepared catalyst was measured by MXP18 (made by Mac Science Co., Ltd.) with a CuKα source (wavelength: 0.154 nm) as an X-ray source under an applied voltage of 40 kV and a current of 40 mA. Powder X-ray diffraction using the continuous scanning method was carried out in a range of 2θ=10° to 80° at a scan speed of 2°/min and a sampling pitch of 0.02°. Data was subjected to four processes, i.e., smoothing, background removal, Kα2 removal, and peak search, using X-ray Powder Research Software System.

Characteristics of several lots of Pt:Ru electrochemical catalyst nanoparticles supported by an interconnected nanowire network are shown in Table 2 below, as well as commercially available Pt:Ru catalysts on a carbon support.

TABLE 2

| Characteristic | Nanowire-supported Pt:Ru Catalysts Lot No: | | | | | | Commercially available Pt:Ru catalysts on carbon |
|---|---|---|---|---|---|---|---|
| | 127 | 127D | 65 | 103D2 | 181-1 | 181-1D | |
| O/Ru | 4.6 | 5.1 | 3.6 | 4.1 | 2.8 | 4.5 | 3 |
| Ru metal (%) | 0 | 0 | 2 | 0 | 9 | <1 | 30 |
| Pt metal (%) | 92 | 71 | 87 | 77 | 98 | 92 | 94 |
| N (%) | 1.3 | 0.8 | 1.2 | 1 | — | — | — |
| Current at 0.5 V | 110 | 141 | 156 | 142 | 27 | 63 | 27 |

Figure 4A:
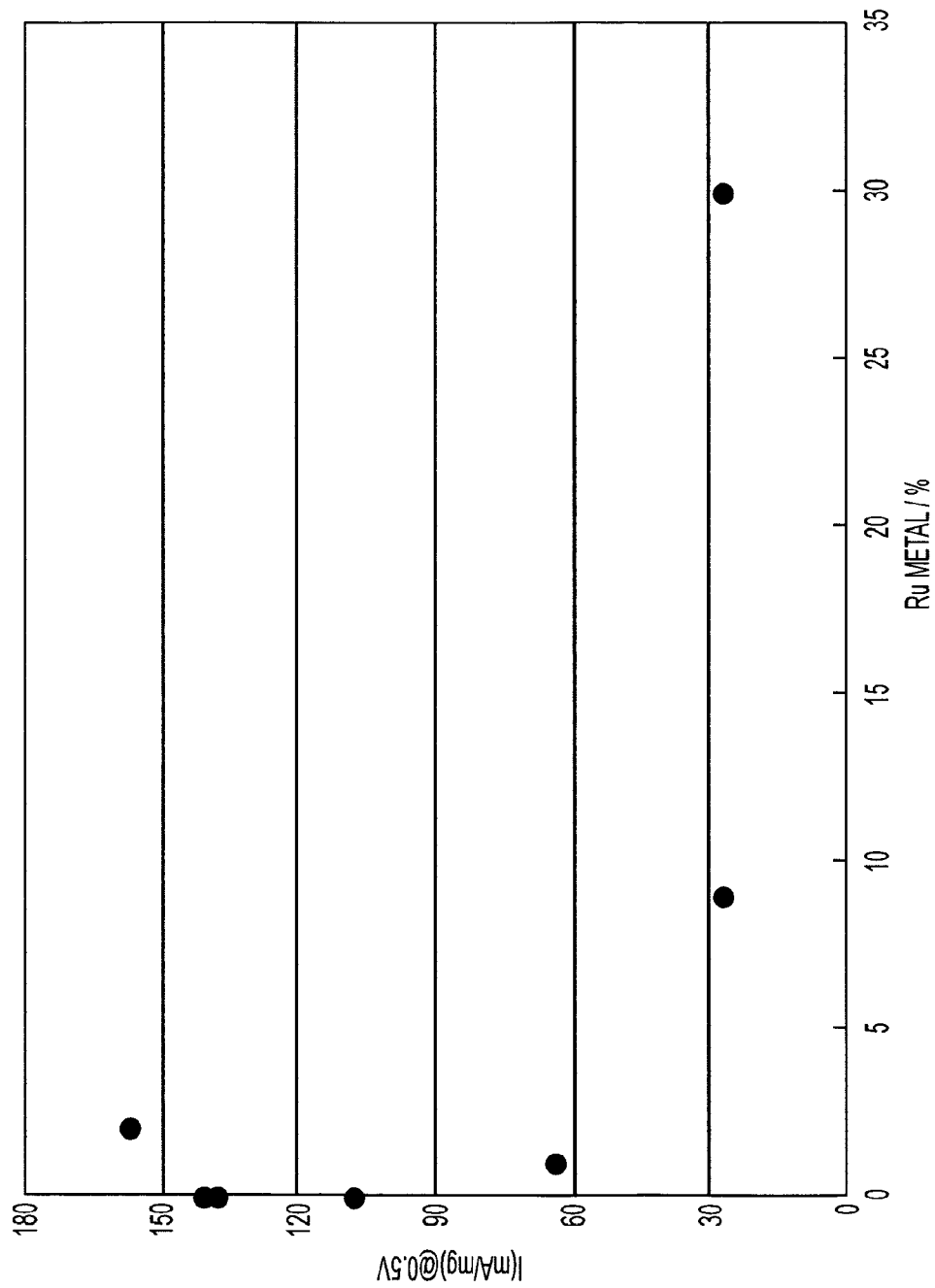
FIG. 4A shows the current at 0.5V for electrochemical catalysts, represented as a percentage of Ru metal.
Figure 4B:
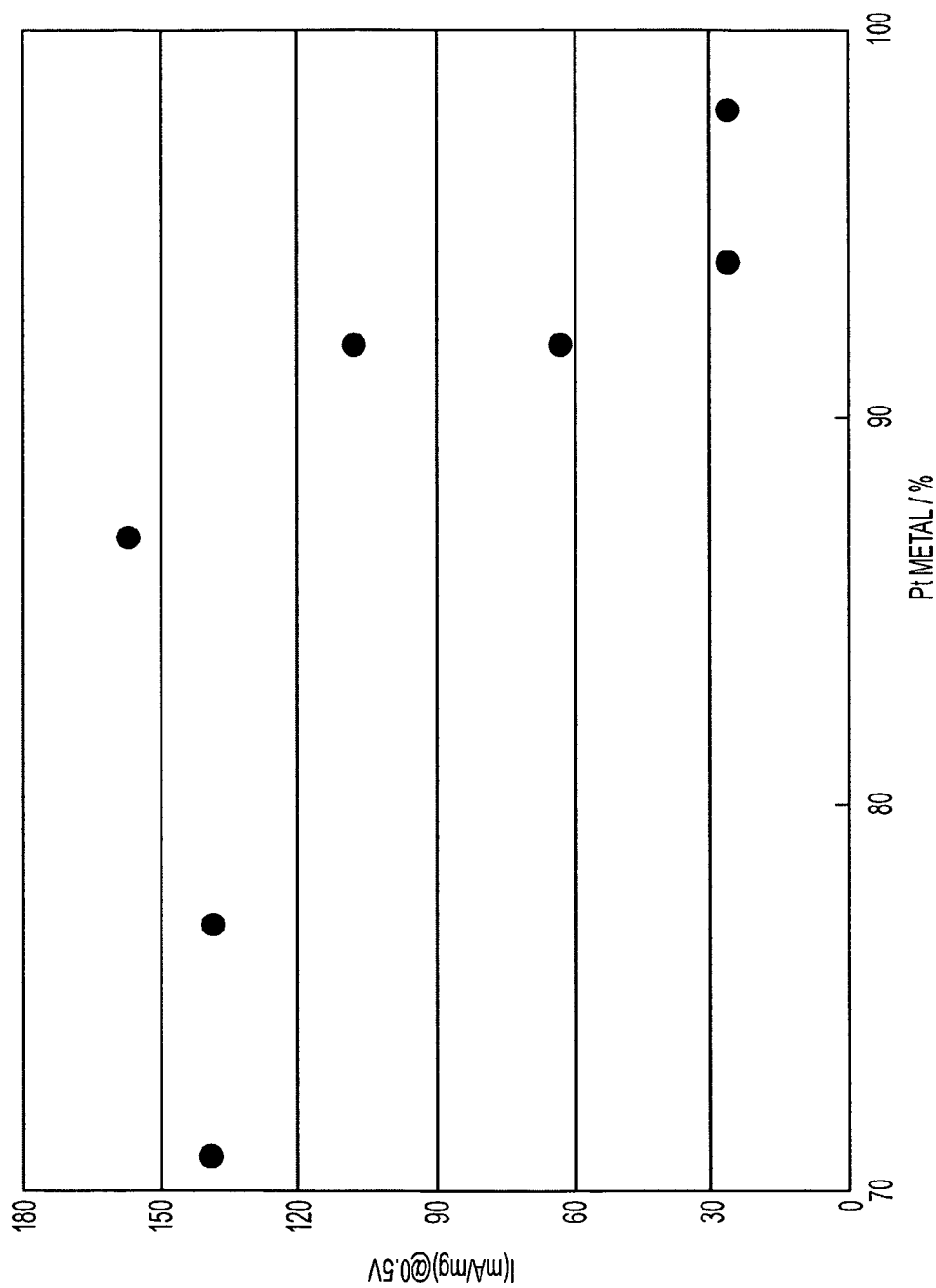
FIG. 4B shows the current at 0.5V for electrochemical catalysts, represented as a percentage of Pt metal FIG. 4B.

FIGS. 4A and 4B show the current at 0.5V for the catalysts in Table 2, represented as a percentage of Ru metal (FIG. 4A) and Pt metal (FIG. 4B).

Note that the X-ray photoelectron spectroscopy (XPS) measurement was carried out under the following conditions.

Excitation λ-ray: monochromatic Al Kα 1, 2 (1486.6 eV)
X-ray diameter: 100 μm
Photoelectron escape angle: 45° (angle of a detector with respect to a sample surface)
Powder sample was pressed onto an indium foil
Horizontal axis correction: main peak of C1s=284.3 eV
Data processing was carried out under the following conditions.
Smoothing: 9-point smoothing
A Ru3p3/2 peak was used to determine a quantity of ruthenium. Pt4f which is a metal component of platinum has an asymmetric peak (the peak of Pt4f is broad on the higher energy side). Therefore, a Pt0 component was separated out as an asymmetric peak, with reference to a Pt4f peak shape of a platinum standard sample as an asymmetry parameter.

The result of the X-ray diffraction analysis showed that the catalysts of the present invention have low crystallinity. Although it is assumed that a catalyst having low crystallinity generally has low durability (stability), it was confirmed that the catalysts of the present invention were equivalent to conventional catalysts in terms of durability (stability).

Example 2

Preparation of Mea with Matching Ionomer

The supported electrochemical catalysts (e.g., Pt:Ru/nanowire catalysts) of the present invention provide distinct advantages over commercially available carbon-supported catalysts (e.g., Pt:Ru/Carbon black or carbon paper), including the absence of primary pores (e.g., no pores less than 20 nm), as well as dimensional matching between the porous structure of the nanowire catalysts and the ionomer utilized, and efficient collection of current from carburized nanowires.

By increasing the density of sulfonic groups on the ionomer and varying the ionomer side chains, the ionomer (e.g., Nafion) is able to be matched to the nanowire-supported electrochemical catalysts, thereby increasing the ratio of catalyst in contact with the electrolyte ionomer. For example, a Nafion ionomer having an equivalent weight (EW) of 1000, or a shorter side chain ionomer (e.g., Hyflon) with a lower EW (e.g., 850) provides enhanced performance of the nanowire-supported electrochemical catalysts in direct methanol fuel cells. The nanowire-supported electrochemical catalysts align on the nanowire supports, thereby exposing the catalysts to large pores in the nanowire structure, thus allowing for the tailored ionomers to efficiently contact the catalysts increasing the ratio of catalysts in contact with ionomer.

Figure 5:
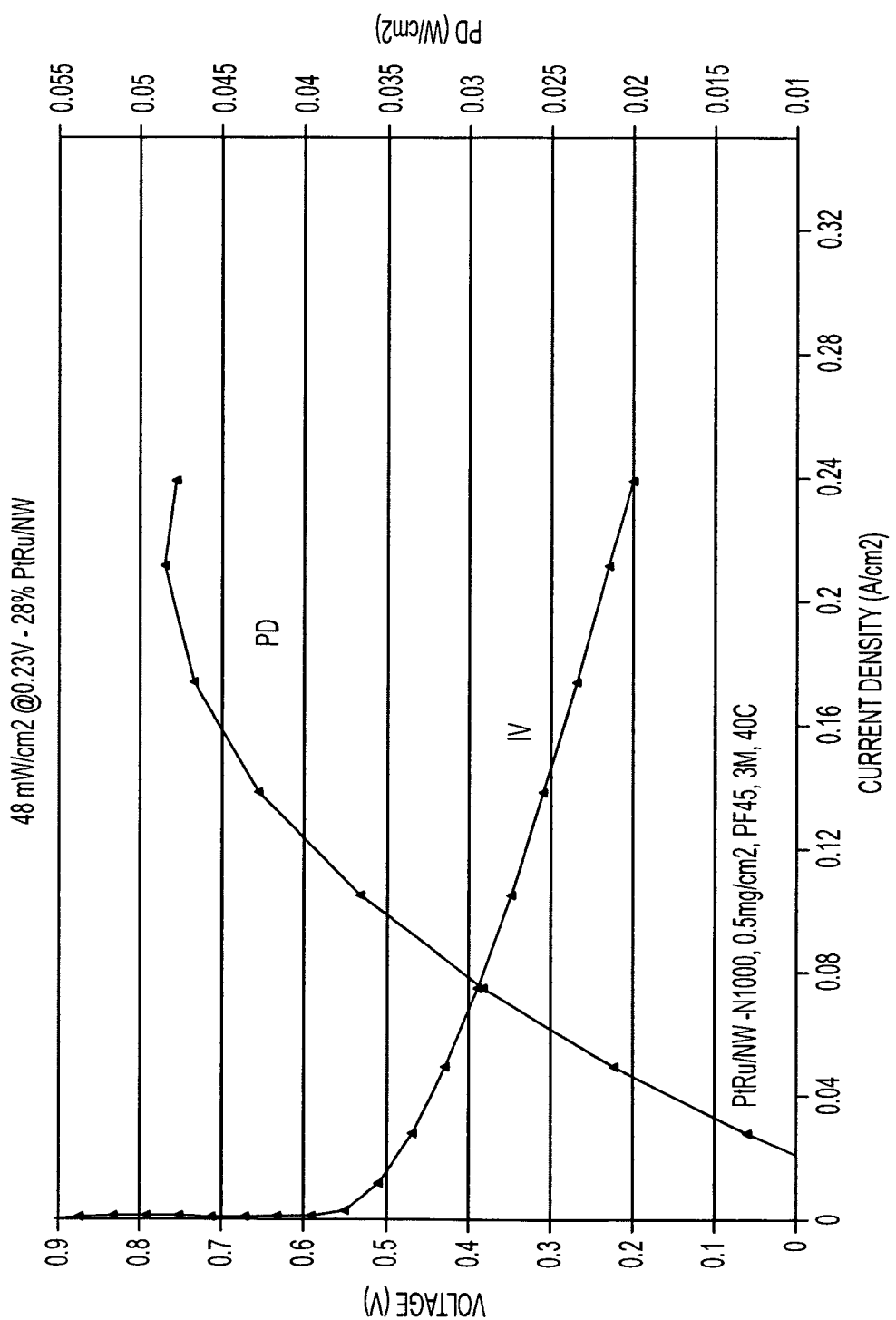
FIG. 5 shows the voltage and power density (PD) of Pt:Ru nanowire-associated catalysts in a fuel cell utilizing a EW1000 Nafion ionomer.

Performance characteristics of a 5 $cm^2$ methanol fuel cell comprising the nanowire-associated electrochemical catalysts of the present invention were determined using various methods. FIG. 5 shows the voltage and power density (PD) of Pt:Ru nanowire-associated catalysts in a fuel cell utilizing a EW1000 Nafion ionomer. The PD at 0.23V was measured to be 48 $mW/cm^2$ for a catalyst comprising 28% Pt:Ru associated nanowire catalysts at a very low loading of 0.5 $mg/cm^2$ for the DMFC with 3M methanol solution at 40° C.

Figure 6:
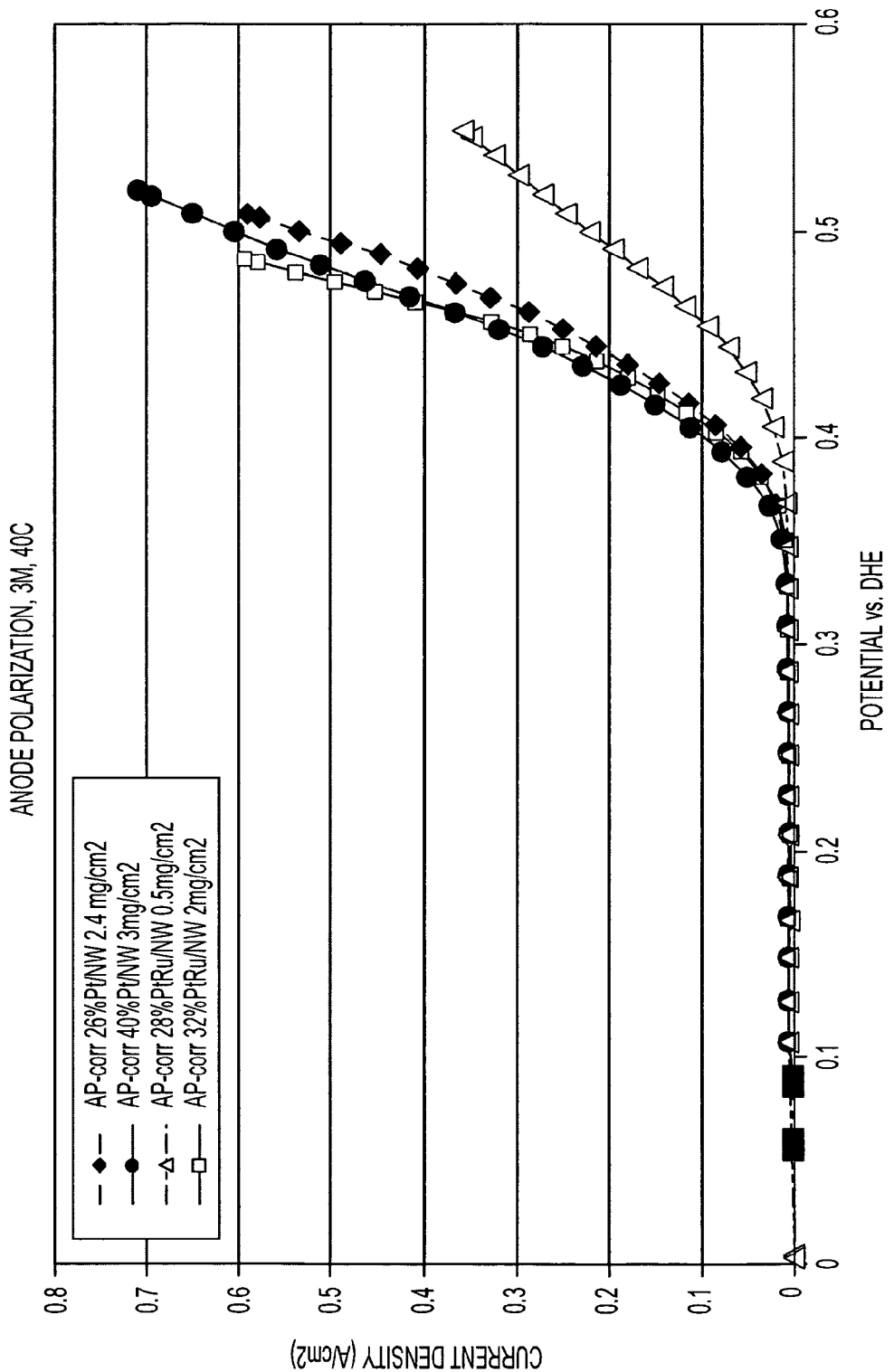
FIG. 6 shows the results of anode polarization representing the current density versus potential vs. DHE for four exemplary nanowire-associated catalysts of the present invention at different percentages of Pt and Pt:Ru catalyst and nanowire density.

FIG. 6 shows the results of anode polarization representing the current density versus potential vs. DHE for four exemplary nanowire-associated catalysts of the present invention at different percentages of Pt and Pt:Ru catalyst and nanowire density. 32% PtRu/NW catalyst showed better performance than PtRu/C catalyst because the loading for 32% PtRu/NW is 2 $mg/cm^2$, which is lower than 52% PtRu/C (2.4 $mg/cm^2$ or 3 $mg/cm^2$). The MEAs used in FIG. 6 include the following: 52% PtRu/C (TKK)-anode/26% Pt/NW-cathode, 2.4 $mg/cm^2$, EW1100 ionomer; 52% PtRu/C(TKK)-anode/40% Pt/NW-cathode, 3 $mg/cm^2$, EW1100; 32% PtRu/NW-anode/46% Pt/C(TKK)-cathode EW1000, 2 $mg/cm^2$; 28% PtRu/NW-anode/46% Pt/C (TKK)-cathode, EW1100, 0.5 $mg/cm^2$.

Figure 7:
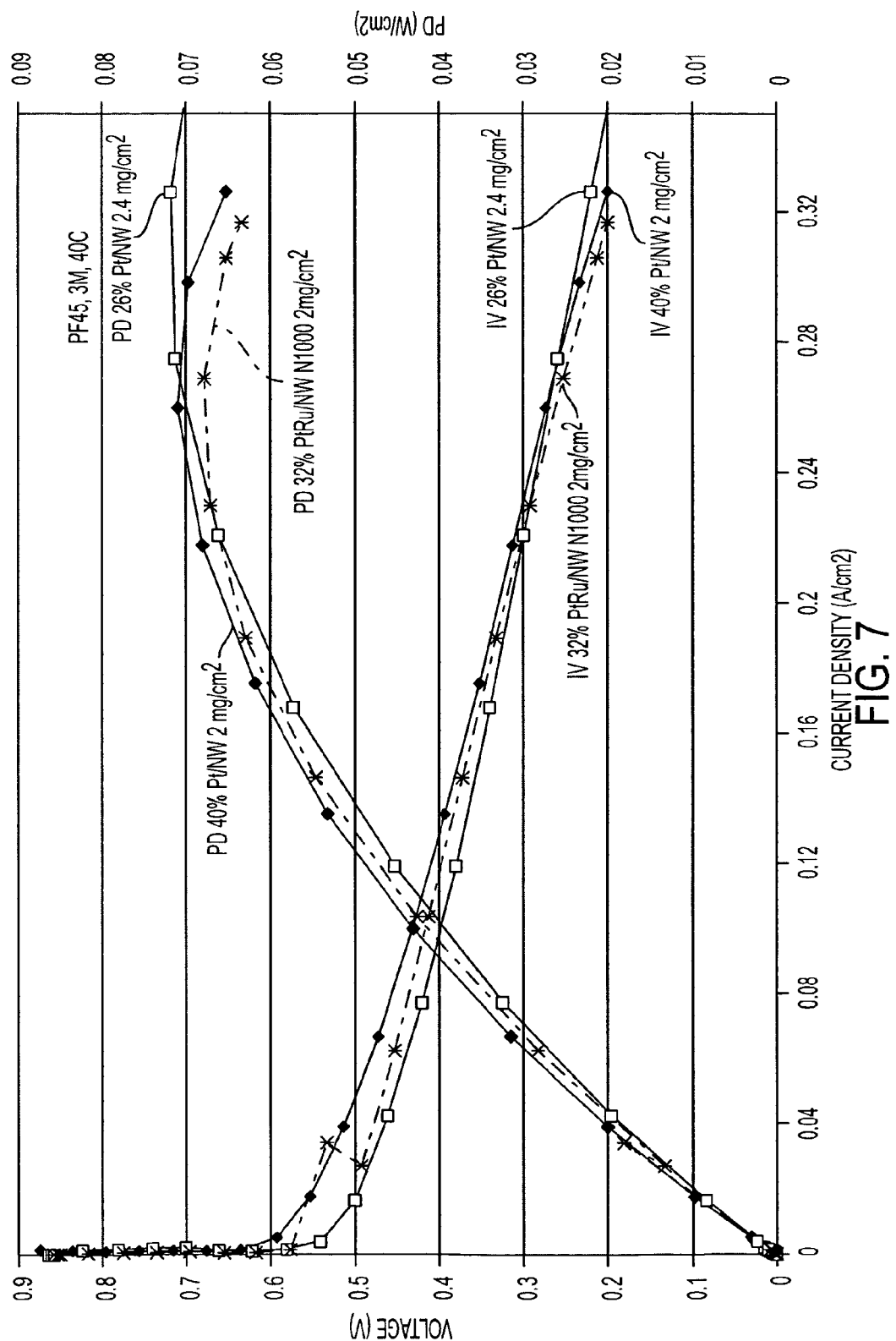
FIG. 7 compares the Voltage and Power Density as a function of current density for Pt and Pt:Ru nanowire associated catalysts, including the impact of EW1000 Nafion on performance.

FIG. 7 compares the Voltage and Power Density as a function of current density for Pt and Pt:Ru nanowire associated catalysts, including the impact of EW1000 Nafion on performance. The MEAs used in FIG. 7 include the following: 52% PtRu/C(TKK)-anode/26% Pt/NW-cathode, 2.4 $mg/cm^2$, EW1100 ionomer; 52% PtRu/C(TKK)-anode/40% Pt/NW-cathode, 2 $mg/cm^2$, EW1100; 32% PtRu/NW-anode/46% Pt/C(TKK)-cathode EW1000, 2 $mg/cm^2$. When the same anode PtRu/C catalysts were used, the 40% Pt/NW cathode showed better performance over the 26% Pt/NW cathode catalyst. When 46% Pt/C cathode was used, the 32% PtRu/NW anode gave a DMFC performance similar to an PtRu/C anode. The ionomer (EW1000) in the PtRu/NW anode layer performed well in the catalyst too. The results in this figure indicate that the Pt/NW cathode catalysts showed promising results.

Figure 8:
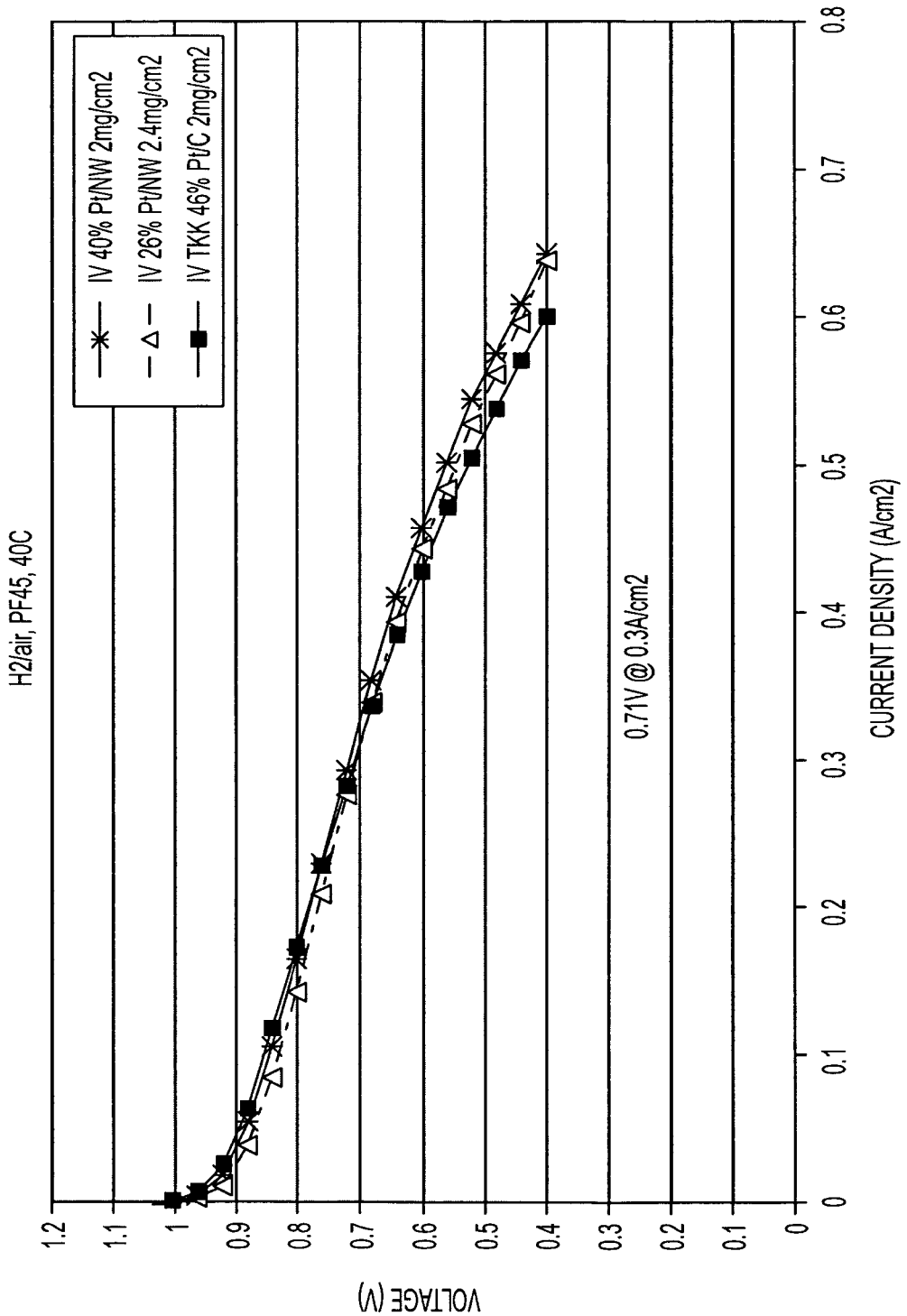
FIG. 8 shows the cathode polarization of two different concentrations of Pt-catalyst-associated nanowires of the present invention as compared with a Pt-Carbon-associated catalyst (TKK (Tanaka Kikinzoku Kogyo K.K.)).

FIG. 8 shows the cathode polarization of two different concentrations of Pt-catalyst-associated nanowires of the present invention as compared with a Pt-Carbon-associated catalyst (TKK (Tanaka Kikinzoku Kogyo K.K.)). A voltage of 0.71V was achieved at a current density of 0.3 A/cm$^2$. This provides direct evidence that both 40% Pt/NW and 26% Pt/NW cathode catalysts perform as well as conventional Pt/C catalyst under hydrogen-air fuel cell condition.

Figure 9:
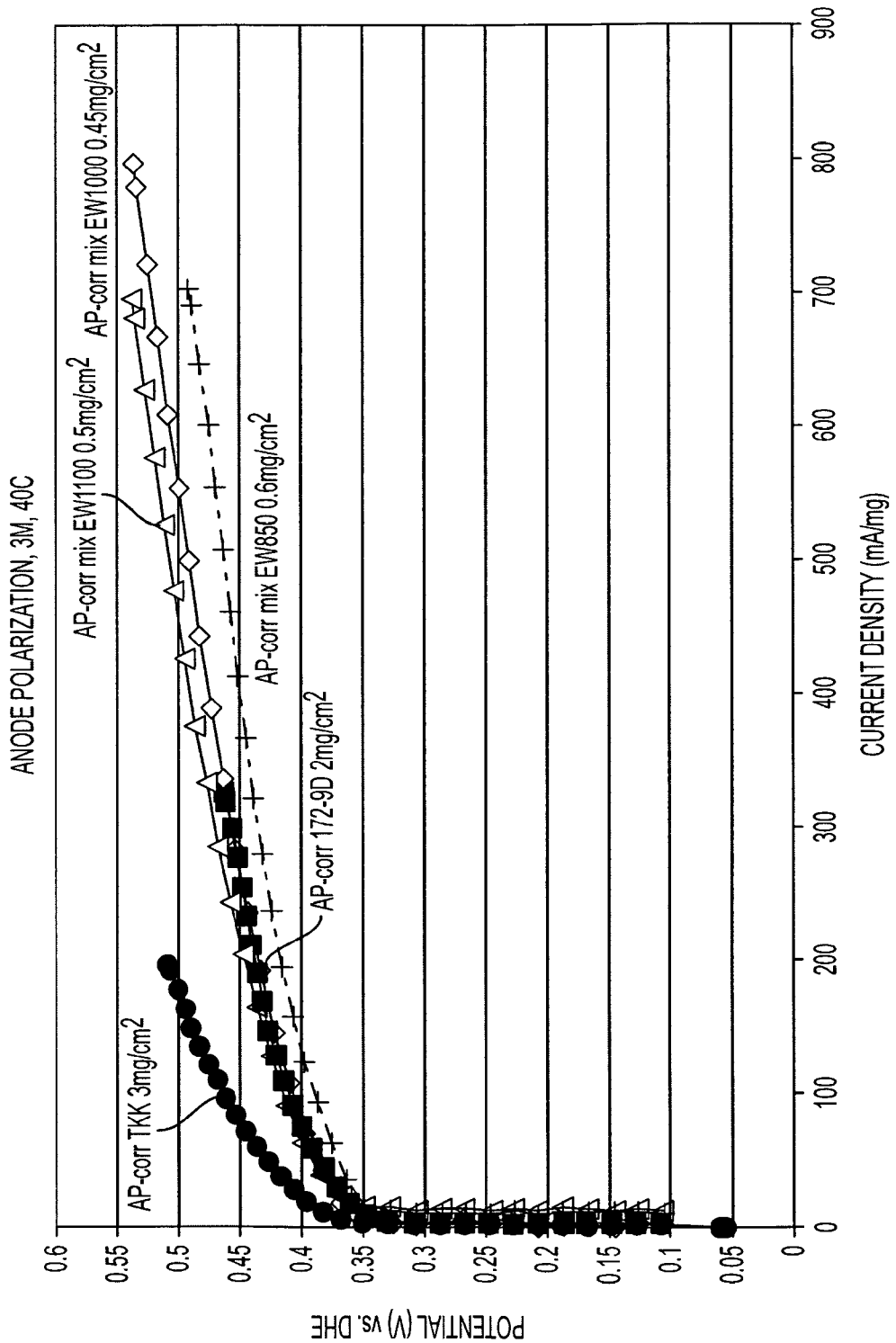
FIG. 9 shows the potential v. DHE versus current density for Pt:Ru-carbon supported catalysts (TKK (Tanaka Kikinzoku Kogyo K.K.)) and nanowire-supported catalyst (172-9D) compared with three Pt:Ru-nanowire-supported electrochemical catalysts of the present invention.

FIG. 9 shows the anode potential versus mass current per Pt:Ru metal weight (mA/mg-PtRu) in Pt:Ru-carbon supported catalyst (TKK) compared to four Pt:Ru-nanowire-supported anode catalysts of the present invention. Nafion with EW 1000 was utilized for the carbon-supported catalyst, as well as nanowire supported catalysts (0.45 mg/cm$^2$ loading and 2 mg/cm$^2$ loading, respectively). The nanowire supported PtRu catalysts showed much better mass activity over the carbon supported catalyst with the identical ionomer EW1000. Nafion with EW1100 and EW1000, and Hyflon with EW850 were utilized for nanowire-supported PtRu catalysts and compared. A clear trend in performance was observed: EW850>EW1000>EW1100 for PtRu/NW catalysts. The metal content of Pt:Ru nanowire-supported electrochemical catalysts was 30%. The anode polarization performance was evaluated at 40° C. by feeding 3 mol/L of methanol to the anode and hydrogen to the cathode. The results are also presented below in Table 3.

TABLE 3

| Current Density (mA/mg) | Anode 27708 w/EW850 (Anode Potential (V)) | Anode 27708 w/EW1000 (Anode Potential (V)) | Anode 27708 w/EW1100 (Anode Potential (V)) | Delta V of EW1000 and EW850 | Delta V of EW1100 and EW850 |
|---|---|---|---|---|---|
| 100 | 0.387 | 0.406 | 0.414 | 0.019 | 0.027 |
| 200 | 0.417 | 0.432 | 0.445 | 0.015 | 0.028 |
| 300 | 0.435 | 0.456 | 0.470 | 0.021 | 0.035 |

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. An electrochemical catalyst supported by a network of interconnected nanowires, the electrochemical catalyst comprising a nanoparticle comprising Pt and Ru, or an alloy including Pt and Ru, wherein the atomic ratio of oxygen in the nanoparticle to Ru in the nanoparticle is in the range of more than 3 to not more than 6.

2. The electrochemical catalyst supported by a network of interconnected nanowires of claim 1, wherein the ratio of oxygen to Ru is in the range of about 3.6 to about 6.

3. The electrochemical catalyst supported by a network of interconnected nanowires of claim 1, wherein the ratio of oxygen to Ru is in the range of about 3.6 to about 5.

4. The electrochemical catalyst supported by a network of interconnected nanowires of claim 1, wherein the ratio of oxygen to Ru is in the range of about 3.6 to about 4.

5. The electrochemical catalyst supported by a network of interconnected nanowires of claim 1, wherein the ratio of oxygen to Ru is about 3.6.

6. The electrochemical catalyst supported by a network of interconnected nanowires of claim 1, wherein the percentage of metallic ruthenium is less than about 30%, the percentage of metallic platinum is about 70% to about 87%, and the nanoparticle comprises nitrogen.

7. The electrochemical catalyst supported by a network of interconnected nanowires of claim 6, wherein the percentage of metallic ruthenium is less than about 20%.

8. The electrochemical catalyst supported by a network of interconnected nanowires of claim 6, wherein the percentage of metallic ruthenium is less than about 10%.

9. The electrochemical catalyst supported by a network of interconnected nanowires of claim 6, wherein the percentage of metallic ruthenium is less than about 2%.

10. The electrochemical catalyst supported by a network of interconnected nanowires of claim 1, wherein a maximum peak of the Pt:Ru nanoparticle in a range of 2θ=30° to 44° is located in a range of not less than 33.0° to less than 37.0°.

11. The electrochemical catalyst supported by a network of interconnected nanowires of claim 1, wherein the nanowires are selected from the group consisting of $RuO_2$, SiC, GaN, $TiO_2$, $SnO_2$, $WC_x$, $MoC_x$, ZrC, $WN_x$, and $MoN_x$, nanowires, wherein x is a positive integer.

12. An electrochemical catalyst supported by a network of interconnected nanowires, the electrochemical catalyst comprising a Pt:Ru nanoparticle, wherein the atomic ratio of oxygen to Ru in the nanoparticle is more than 3 to not more than 6, the percentage of metallic ruthenium is less than about 30%, and the percentage of metallic platinum is about 70% to about 90%.

13. The electrochemical catalyst supported by a network of interconnected nanowires of claim 12, wherein the atomic ratio of oxygen to Ru in the nanoparticle is about 3.6 to about 4, the percentage of metallic ruthenium is less than about 2%, and the percentage of metallic platinum is about 70% to about 87%, and the nanoparticle comprises nitrogen.

14. The electrochemical catalyst supported by a network of interconnected nanowires of claim 12, wherein the nanowire is selected from the group consisting of $RuO_2$, SiC, GaN, $TiO_2$, $SnO_2$, $WC_x$, $MoC_x$, ZrC, $WN_x$, and $MoN_x$, nanowires, wherein x is a positive integer.

15. The electrochemical catalyst supported by a network of interconnected nanowires of claim 12, wherein a maximum peak of the Pt:Ru nanoparticle in a range of 2θ=30° to 44° is located in a range of not less than 33.0° to less than 37.0°.

* * * * *